(12) United States Patent
Pfeffer et al.

(10) Patent No.: US 8,285,609 B2
(45) Date of Patent: Oct. 9, 2012

(54) SYSTEMS AND METHODS TO OUTSOURCE SERVICE AND SUPPORT OPERATIONS

(75) Inventors: David J. Pfeffer, Spring, TX (US); Claude Laval, Grenoble (FR); Steven R. Haney, Spring, TX (US); Philippe Warembourg, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 12/755,991

(22) Filed: Apr. 7, 2010

(65) Prior Publication Data

US 2011/0251929 A1    Oct. 13, 2011

(51) Int. Cl.
G06Q 10/00    (2012.01)
G06Q 30/00    (2012.01)

(52) U.S. Cl. .......... 705/28; 705/334; 705/336; 705/340
(58) Field of Classification Search .............. 705/28, 705/334, 336, 340
See application file for complete search history.

(56) References Cited

U.S. PATENT DOCUMENTS

| | | | |
|---|---|---|---|
| 6,851,611 B1 | 2/2005 | Shaw-Sinclair | |
| 7,660,721 B2* | 2/2010 | Williams et al. | 705/330 |
| 7,991,657 B2* | 8/2011 | Kreifels et al. | 705/29 |
| 2001/0032141 A1* | 10/2001 | Drattell | 705/26 |
| 2001/0032143 A1* | 10/2001 | Haseltine | 705/26 |
| 2002/0099612 A1* | 7/2002 | Seaman et al. | 705/26 |
| 2003/0093340 A1* | 5/2003 | Krystek et al. | 705/28 |
| 2004/0084527 A1* | 5/2004 | Bong et al. | 235/385 |
| 2005/0065858 A1* | 3/2005 | Tenzer et al. | 705/26 |
| 2005/0267822 A1* | 12/2005 | Mead | 705/29 |
| 2005/0278247 A1* | 12/2005 | Benedict et al. | 705/38 |
| 2006/0149577 A1* | 7/2006 | Stashluk et al. | 705/1 |
| 2009/0259505 A1 | 10/2009 | Tadayon | |
| 2010/0131420 A1* | 5/2010 | Williams et al. | 705/340 |

FOREIGN PATENT DOCUMENTS

WO    WO0139029    5/2001

OTHER PUBLICATIONS

Amaral, Jason; Billington, Corey A; Tsay, Andy A Outsourcing production without losing control. Supply Chain Management Review v8n8 pp. 44-52. Nov./Dec. 2004.*
Baldenius et al., "Incentives for Efficient Inventory Management: The Role of Historical Cost," Management Science, vol. 51, Issue 7, 2005, Abstract and References Only, 3 pages.

* cited by examiner

Primary Examiner — Scott Zare

(57) ABSTRACT

Systems and methods to outsource service and support operations are disclosed. An example method disclosed herein includes electronically maintaining an inventory at an outsourced service and support partner (OSSP) without intervention by a separate manufacturing entity by ordering inventory items from a supplier separate from the manufacturing entity and the OSSP at a cost determined based on an amount of similar or substantially identical inventory items obtained separately by the manufacturing entity for manufacturing units, and using the inventory to at least one of service a unit returned to the OSSP by a customer or ship an inventory item from the OSSP to the customer in response to receiving an order notification from the manufacturing entity at the OSSP.

13 Claims, 9 Drawing Sheets

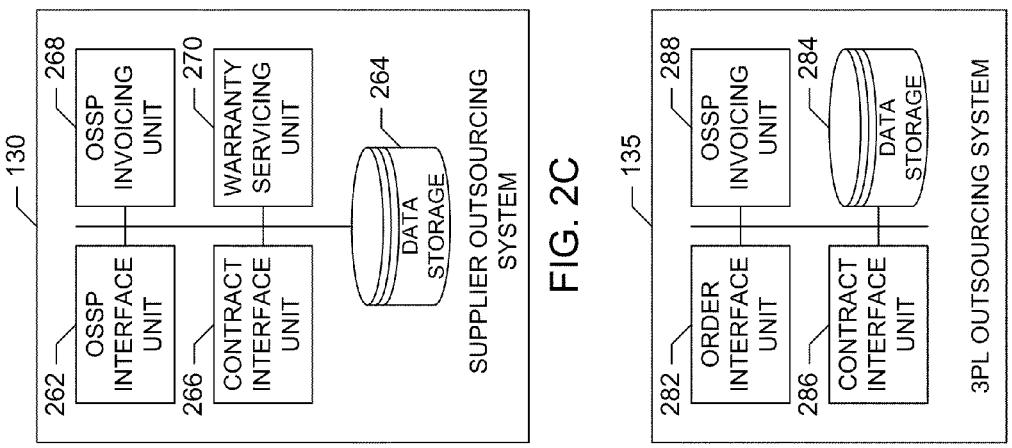
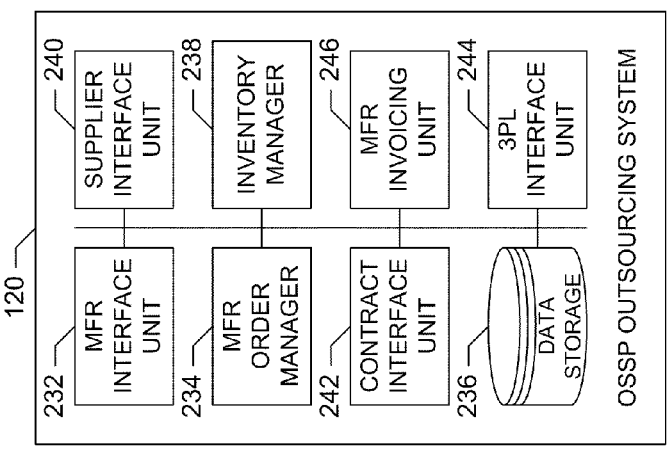
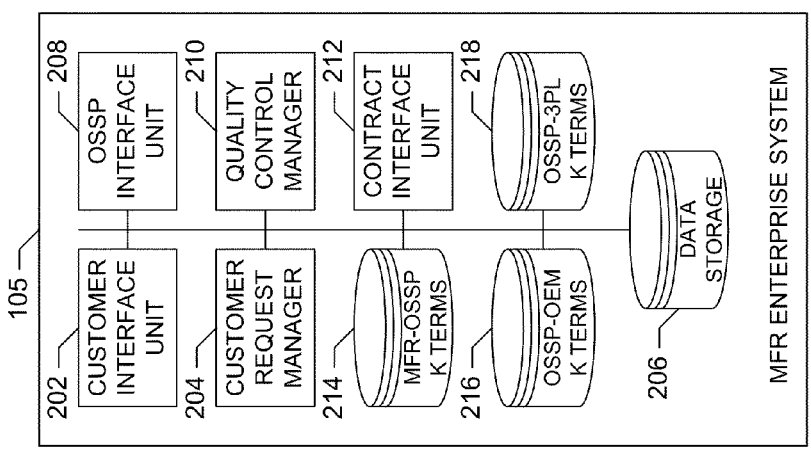

SYSTEMS AND METHODS TO OUTSOURCE SERVICE AND SUPPORT OPERATIONS

BACKGROUND

Product manufacturers routinely provide service and support for products provided to their customers. To maintain quality and achieve a consistent customer experience, many product manufacturers resort to providing most, if not all, service and support operations themselves.

BRIEF DESCRIPTION OF THE DRAWINGS

FIGS. 2A-D are block diagrams of an example manufacturer enterprise system, an example outsourced service and support partner (OSSP) outsourcing system, an example supplier outsourcing system and an example third party logistics (3PL) outsourcing system that may be used to implement the service and support outsourcing system of FIG. 1.

DETAILED DESCRIPTION

Figure 1:
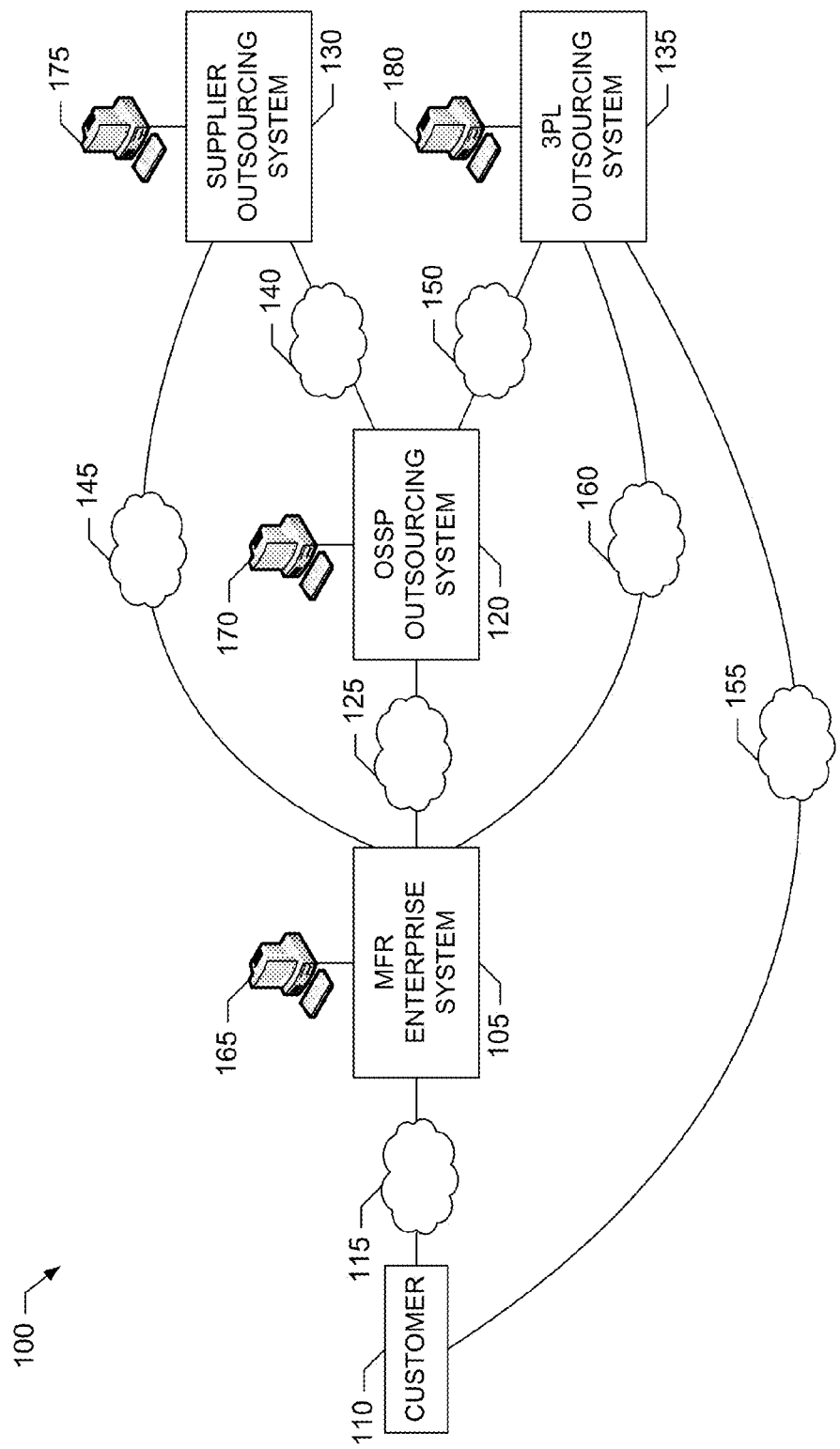
FIG. 1 is an example service and support outsourcing system.

Methods and systems to outsource service and support operations are disclosed herein. Although the following discloses example methods and systems including, among other components, software executed on hardware, it should be noted that such methods and systems are merely illustrative and should not be considered as limiting. For example, it is contemplated that any or all of these hardware and software components could be implemented exclusively in hardware, exclusively in software, exclusively in firmware, or in any combination of hardware, software, and/or firmware. Accordingly, while the following describes example methods and systems, the examples provided are not the only way to implement such methods and systems.

In an example technique to outsource service and support operations described herein, a manufacturing entity engages a separate outsourced service and support partner (OSSP) to provide service and support for products provided to customers. In such an example, the OSSP maintains (e.g., electronically) an inventory of, for example, repair parts and/or replacement equipment without intervention by the separate manufacturing entity (e.g., such as without being instructed by the manufacturing entity as to when the inventory is to be checked and replenished, and/or from whom and/or at what cost items to replenish the inventory are to be purchased, etc.). The OSSP maintains the inventory, at least in part, by ordering (e.g., electronically) or otherwise obtaining inventory items from one or more suppliers that are separate (e.g., different) from the manufacturing entity and the OSSP. In some examples, the cost of the inventory items is determined (e.g., via contract negotiations among the OSSP and the supplier(s) and, in at least some cases, the manufacturing entity) based on an amount of similar or substantially identical inventory items to be obtained from the supplier(s) separately by the manufacturing entity for manufacturing units (e.g., products). The example outsourcing technique also involves the OSSP, in response to receiving a repair or replacement order notification (e.g., electronically) from the manufacturing entity, using the inventory to, for example, service a unit (e.g., product) returned to the OSSP by a customer, ship a particular inventory item from the OSSP to the customer (e.g., for self-repair of the unit by the customer), etc. The OSSP can also send (e.g., electronically) a completion notification to the manufacturer upon completing the repair or replacement order, which can be used by the manufacturing entity to perform quality control evaluations.

In at least some example implementations of the outsourcing techniques described herein, the OSSP also invoices the manufacturing entity for devaluation of unused inventory if the manufacturing entity specifies inventory requirements, such as required inventory levels (e.g., but otherwise does not intervene in the OSSP's inventory maintenance). However, the OSSP does not invoice the manufacturing entity for the devaluation of the unused inventory if the manufacturing entity does not specify the inventory requirements. In some examples where the manufacturing entity specifies inventory requirements, the OSSP does not invoice the manufacturing entity for the devaluation of unused inventory items that were not obtained to satisfy the OSSP's service and support operations for the manufacturing entity, such as inventory items obtained by adding customer returned items (e.g., if reusable with or without repair) to the inventory (rather than simply scrapping or otherwise discarding the returned items), inventory items obtained for purposes unrelated to the OSSP's service and support operations for the particular manufacturing entity (e.g., if the OSSP has relationships with multiple, different manufacturing entity's), etc. Additionally, in at least some example implementations, the OSSP further invoices the manufacturing entity for each inventory item used to service returned customer units and/or shipped to customers as replacements. The value of each inventory item may be adjusted (e.g., to account for price fluctuations over time) based on a duration of time expected to elapse from when the inventory item was used to service a unit or was shipped to a customer and when the manufacturing entity is actually invoiced (e.g., to account for potential devaluation of the used inventory item). Such invoicing can occur at final disposition of the inventory item (e.g., when a determination that the inventory item is scrap, is non-returnable, has not been returned, etc., is made), rather than when the inventory item is initially used for service or shipped to a customer. Also, in the case of inventory item(s) used to service customer units, the value of the inventory item(s) may be included in an overall contracted service price, rather than being billed separately to the manufacturing entity.

Additionally, in at least some example implementations of the outsourcing techniques described herein, a third party logistics (3PL) provider, separate (e.g., different) from the manufacturing entity and the OSSP, is engaged to ship units (e.g., before and after repair) and/or inventory items (e.g., for replacement by a customer) between customers and the OSSP. Furthermore, in examples where the OSSP is one or many OSSPs engaged by the manufacturing entity, shipping rates with the 3PL provider can be determined (e.g., via contract negotiations among the OSSP(s), the 3PL provider and, in at least some cases, the manufacturing entity) based on a total volume of expected shipments associated with the manufacturing entity across all of the plurality of OSSPs. In some examples, the 3PL may invoice the manufacturing entity directly rather (e.g., using an account number assigned to the manufacturing entity) than invoicing the OSSP to avoid an additional invoice reconciliation between the OSSP and the product manufacturing entity.

The example techniques to outsource service and support operations described herein provide many benefits and advantages over conventional techniques. For example, under a prior model in which a product manufacturer retains service and support operations in-house, the product manufacturer typically needs to purchase and maintain adequate inventories of repair parts and/or replacement equipment to enable timely resolution of customer service and support requests, which can be costly (e.g., on the order of tens or even hundreds of millions of dollars in some circumstances) and can also require significant warehouse space and logistics for inventory storage. Additionally, under a prior in-house service and support model, the product manufacturer can incur potentially significant overhead expenses associated with, for example, inventory depreciation, inventory tracking and logistics involved in parts and equipment ordering, processing warranty claims, shipping products and replacement equipment to and from customers, employee costs, etc.

In contrast with such prior in-house service and support techniques, at least some of the example outsourcing techniques described herein shift responsibility for inventory maintenance to one or more third party OSSPs. Thus, the product manufacturer can receive a significant cost benefit by not needing to maintain an inventory of repair parts and/or replacement equipment, with the associated costs and warehousing requirements. Additionally, in at least some example outsourcing techniques described herein, responsibility for inventory depreciation, inventory ordering logistics, warranty claim logistics, shipping logistics, etc., is also shifted to the third party OSSP(s), resulting in associated reductions of the product manufacturer's overhead expenses. However, the product manufacturer can retain customer point-of-contact and quality management responsibilities, thereby enabling the product manufacturer to achieve a desired overall customer experience. Furthermore, through incentives to the OSSP(s) and quality control evaluations, at least some of the example outsourcing techniques described herein can achieve improved responsiveness to customer service and support requests, reduced repair and response cycle times, etc. A further unexpected economical, as well as environmental, benefit of at least some of the example outsourcing techniques described herein is the incentive (e.g., such as to reduce inventory procurement costs) to add (e.g., after refurbishing) customer-returned equipment to the service and support inventory, rather than simply scrapping (e.g., discarding, recycling, etc.) such equipment.

Turning to the figures, a block diagram of a disclosed example service and support outsourcing system 100 is illustrated in FIG. 1. The service and support outsourcing system 100 includes an example manufacturer enterprise system 105 to, among other things, establish and manage relationships with one or more third party OSSPs providing outsourced service and support for a manufacturing entity. The manufacturing entity can be any type of product manufacturer. The terms manufacturing entity, product manufacturer and product manufacturing entity are used interchangeably herein. An OSSP can be any third party entity (e.g., person, company, organization, etc.) providing outsourced service and/or support operations for the product manufacturing entity. Examples of service operations include, but are not limited to, whole unit repair involving repairing equipment (e.g., components) and/or replacing equipment in a whole unit (e.g., the product) returned by a customer. Such whole unit repair can be performed under warranty or out of warranty. Examples of support operations include, but are not limited to, sending replacement equipment to a customer (or other authorized service provider or similar entity), who will service the unit, and then receiving the replaced (e.g., faulty) equipment back from the customer. In example implementations involving multiple OSSPs, each OSSP may provide similar or different outsourced service and/or support operations for the product manufacturing entity.

As described in greater detail below, the manufacturer enterprise system 105 of the illustrated example is located at the product manufacturing entity and provides one or more customer point-of-contact interfaces to enable one or more customers 110 to contact the product manufacturing entity to request service or support for one or more of the manufacturer's products, as well as to receive status updates (if appropriate), shipment notifications, etc. The customer(s) 110 interface with the manufacturer enterprise system 105 via one or more example communication networks 115. Because the manufacturer enterprise system 105 provides the customer point-of-contact interface(s), the product manufacturing entity is able to control and achieve a uniform customer service and support experience.

The manufacturer enterprise system 105 also processes the customer service and support requests, notifies the appropriate OSSP that is to act on the request, receives completion notifications from the OSSP when a customer service/support request has been completed, receives invoices from the OSSP, performs quality control for the outsourced service and support process, etc. Additionally, in at least some example implementations, the manufacturer enterprise system 105 provides central storage of contract terms and other information defining the relationships among the manufacturing entity, the OSSP(s), one or more suppliers, one or more 3PL provides, etc., implementing outsourced service and support for the manufacturing entity. Notably, the manufacturer enterprise system 105 does not need to maintain an inventory of items (e.g., such as repair parts, replacement equipment, etc.) and/or manage inventory depreciation, inventory ordering logistics, warranty claim logistics, shipping logistics, etc., associated with service and support operations because such activities have been outsourced and, thus, are the responsibility of the OSSP(s). An example implementation of the manufacturer enterprise system 105 is illustrated in FIG. 2A and described in greater detail below.

The service and support outsourcing system 100 of FIG. 1 also includes one or more example OSSP outsourcing systems 120 associated with respective OSSPs. Each OSSP outsourcing system 120 interfaces with the manufacturer enterprise system 105 via an example communication network 125. As described in greater detail below, the OSSP outsourcing system 120 for a particular OSSP receives service and support order notifications from the manufacturer enterprise system 105 and provides associated status update and request completion notifications to the manufacturer enterprise system 105. The OSSP outsourcing system 120 also sends invoices (e.g., based on contract terms that may be retrieved from the manufacturer enterprise system 105 via the communication network 125) to the manufacturer enterprise system 105 for inventory items (e.g., such as repair parts, replacement equipment, etc.) used to service and support the product manufacturing entity's products for its customers, with invoicing occurring, for example, at final disposition of the inventory item (e.g., when a determination that the inventory item is scrap, is non-returnable, has not been returned, etc., is made), rather than when the inventory item is initially used for service or shipped to a customer. As described in greater detail below, the invoicing of such used inventory item(s) can also factor in potential devaluation between when the inventory item(s) were purchased by the OSSP and when the inventory item(s) were subsequently used for service and support operations. In at least some example implementations, the OSSP outsourcing system 120 can invoice (e.g., based on contract terms retrieved from the manufacturer enterprise system 105 via the communication network 125) the manufacturer enterprise system 105 for at least some unused inventory depreciation, as described in greater detail below.

Furthermore, the OSSP outsourcing system 120 maintains an inventory of items (e.g., such as repair parts, replacement equipment, etc.) used by the OSSP to perform its service and support operations. As such, the OSSP outsourcing system 120 interfaces with one or more supplier outsourcing systems 130 associated with one or more suppliers to order, purchase or otherwise obtain inventory items to replenish the inventory, satisfy particular service/support requests, etc. The OSSP outsourcing system 120 also interfaces with the supplier outsourcing system(s) 130 to process warranty claims.

To manage shipping of units (e.g., products or parts of products) from customers to the OSSP for service, as well as shipping of repaired units back to customers, the OSSP outsourcing system 120 interfaces with one or more 3PL outsourcing systems 135 associated with one or more 3PL providers. The OSSP outsourcing system 120 also interfaces with the 3PL outsourcing system(s) 135 to manage shipping of replacement equipment (or other inventory items) from the OSSP to customers, as well as shipping of replaced (e.g., faulty) equipment from customers back to the OSSP. An example implementation of the OSSP outsourcing system 120 is illustrated in FIG. 2B and described in greater detail below The one or more supplier outsourcing systems 130 included in the service and support outsourcing system 100 of FIG. 1 enable one or more respective suppliers to receive and fulfill orders from one or more of the OSSPs providing outsourced service and/or support for the product manufacturing entity. For example, as shown in FIG. 1, a supplier outsourcing system 130 interfaces with the OSSP outsourcing system 120 via an example communication network 140 to receive orders for repair parts, replacement equipment, etc., or any other inventory item. As such, the supplier associated with the supplier outsourcing system 130 can be any type of supplier, such as an original equipment manufacturer (OEM), an original design manufacturer (ODM), etc.

In the illustrated example, the supplier outsourcing system 130 also interfaces with the manufacturer enterprise system 105 via an example communication network 145 to retrieve contract terms governing the cost/price of the inventory items ordered by the OSSP via the OSSP outsourcing system 120. For example, the OSSP(s) and supplier(s) can determine (e.g., via negotiation) inventory item costs/prices based not only on the expected amount (e.g., volume, quantity, etc.) of items to be purchased by each individual OSSP separately, but primarily on the (usually much larger) amount of substantially identical or similar items to be purchased by the product manufacturing entity separately for product manufacturing purposes. This allows economies of scale to be achieved with associated reductions in the cost/price of inventory items for the OSSPs, thereby providing incentive for the OSSPs to enter into outsourcing agreements with the product manufacturing entity. In at least some examples, to enable an OSSP to benefit from the product manufacturing entity's purchasing power, the product manufacturing entity sends a letter of agency or other authorization or notification to a supplier to indicate that the OSSP is associated with the product manufacturing entity rather than being directly involved in negotiations between the OSSP and the supplier. In other examples, inventory item costs/prices are determined based on the expected amount (e.g., volume, quantity, etc.) of items to be purchased by each OSSP individually or among a group of OSSPs, but without the product manufacturing entity's purchasing amounts being considered. For example, if the OSSP provides service and support for multiple different product manufacturing entities, or is also a product manufacturing entity itself, the OSSP may be able to achieve more favorable pricing based on its own purchasing power.

The one or more 3PL outsourcing systems 135 included in the service and support outsourcing system 100 of FIG. 1 enable one or more respective 3PL providers to receive and fulfill shipping requests associated with one or more of the OSSPs providing outsourced service and/or support for the product manufacturing entity. For example, as shown in FIG. 1, a 3PL outsourcing system 135 interfaces with the OSSP outsourcing system 120 via an example communication network 150 to receive requests to ship, for example, repaired units and/or replacement parts to a customer 110. The 3PL outsourcing system 135 processes such requests and causes, for example, the repaired units and/or replacement parts to be picked up at the OSSP site and shipped to the customers 110. In the illustrated example, the customers 110 can also interface directly with the 3PL outsourcing system 135 via an example communication network 155 to request shipping of units to be repaired or replaced equipment to be returned to the OSSP. Alternatively, the manufacturing entity can use its manufacturer enterprise system 105 to interface with the 3PL outsourcing system 135 via an example communication network 160 to coordinate such shipping on behalf of the customers 110. As such, the 3PL provider associated with the 3PL outsourcing system 135 can be, for example, a postal service (e.g., such as the United States Postal Service®), a shipping service (e.g., such as FedEx®, United Parcel Service (UPS)®, DHL Express®, etc.) or any other type of governmental or non-governmental shipping logistics provider.

In the illustrated example, the 3PL outsourcing system 135 also interfaces with the manufacturer enterprise system 105 via the example communication network 160 to retrieve contract terms governing shipping rates for shipping units and equipment between OSSP(s) and customers 110. For example, the product manufacturing entity, OSSP(s) and 3PL (s) can determine (e.g., via negotiation) shipping rates based not only on the volume of expected shipments to/from each OSSP individually, but on the expected volume of shipments to/from all OSSPs providing outsourcing service and support for the product manufacturing entity. In this way, further economies of scale and associated reductions in shipping rates can be achieved, thereby providing even further incentive for the OSSPs to enter into outsourcing agreements with the product manufacturing entity. Also, in at least some examples, the 3PL may invoice an account number of the product manufacturing entity directly rather than invoicing the OSSP to avoid an additional invoice reconciliation that would be needed between the OSSP and the product manufacturing entity.

In the example service and support outsourcing system 100 of FIG. 1, one or more terminals 165 interface with the manufacturer enterprise system 105 to, for example, enable input and output of information, system configuration, etc. Similarly, one or more terminals 170, 175 and 180 interface with the respective OSSP outsourcing system(s) 120, supplier outsourcing system(s) 130 and 3PL outsourcing system(s) 135 to provide similar functionality.

As shown in the example system 100 of FIG. 1, communication networks 115, 125, 140, 145, 150, 155 and 160 are used to communicatively couple the manufacturer enterprise system 105, the OSSP outsourcing system(s) 120, the supplier outsourcing system(s) 130 and the 3PL outsourcing system(s) 135. Each such communication network 115, 125, 140, 145, 150, 155 and 160 can be implemented by any type of communication network, such as the Internet, a broadband communications network, a public switched telephone network (PSTN), a mobile cellular network, a mobile satellite network, a dedicated communication link, etc., or any combination thereof, and can employ any type of Electronic Data Interchange (EDI) or other protocol for exchanging information. Furthermore, in at least some example implementations, one or more subsets of the communication networks 115, 125, 140, 145, 150, 155 and 160, or even all of the communication networks 115, 125, 140, 145, 150, 155 and 160, can be implemented by a single network rather than by separate networks.

In the service and support outsourcing system 100, the manufacturer enterprise system 105 is described as providing centralized storage of contract terms defining the relationships among the entities implementing the system. Alternatively, such contract terms could be centrally stored at the OSSP outsourcing system(s) 120 or distributed among the OSSP outsourcing system(s) 120, the supplier outsourcing system(s) 130 and/or the 3PL outsourcing system(s) 135 to further decouple the product manufacturing entity from the responsibility of managing logistics in the service and support outsourcing system 100. Also, the service and support outsourcing system 100 is described in the context of establishing and managing service and support operations for a product manufacturing entity. However, the service and support outsourcing system 100 and, more generally, the example service and support outsourcing methods described herein can be readily adapted for use in other contexts in which service, support and/or similar operations are to be outsourced.

Example implementations of the manufacturer enterprise system 105, the OSSP outsourcing system 120, the supplier outsourcing system 130 and the 3PL outsourcing system 135 of FIG. 1 are illustrated in FIGS. 2A-D. The manufacturer enterprise system 105 of FIG. 2A includes an example customer interface unit 202 to receive customer service and support requests, provide status notifications, send service/support completion notifications, etc., and otherwise manage the customer's service and support experience. In some examples, the customer interface unit 202 can be configured to receive customer service requests via the communication network 115 in an electronic format, such as in the format of one or more electronic messages, electronic mail (email), pages, etc., generated when, for example, a customer calls a call center or an automated support center, interacts with a web site, etc. Similarly, the customer interface unit 202 can be configured to use the communication network 115 to send the status and completion notifications to its customers in electronic format, such as in the format of one or more electronic messages, electronic mail, pages, automated phone calls, etc.

The manufacturer enterprise system 105 of FIG. 2A also includes an example customer request manager 204 to manage received customer service and support requests. In some examples, the customer request manager 204 logs a received customer request in an example data storage unit 206 included in the manufacturer enterprise system 105. The customer request manager 204 also determines whether the request corresponds to a service request or a support request. In the examples described herein, a service request involves the customer returning a whole unit (e.g., product) for repair and, thus, is also referred to herein as a repair order involving a complete whole unit repair (WUR). For example, if the product manufacturer is a consumer electronics manufacturer selling computers to the marketplace, a service request may involve the customer's computer being returned for service. In contrast, in the examples described herein, a support request involves replacement equipment (e.g., such as a hard drive, power supply, motherboard, etc.) being sent to a customer to fulfill the support request, with the customer (or other authorized service partner or similar entity) then performing self-repair of the unit (e.g., computer) using the received replacement equipment. As such, a support request is also referred to herein as a replacement order for a part(s) fulfillment (PFF) shipment, with the part(s) being shipped to fulfill the support request corresponding to replacement equipment (e.g., such as a hard drive, power supply, motherboard, etc.), as compared to repair parts (e.g., chips, capacitors, resistors, etc.) that may be used by the OSSP to repair particular equipment in a whole unit.

Additionally, the customer request manager 204 processes status notifications received from an OSSP providing outsourced service or support in response to a received customer request. The customer request manager 204 logs the status notifications in the data storage unit 206, which can be retrieved by the customer interface unit 202 and sent to the customer. The customer request manager 204 also processes completion notifications received from the OSSP indicating that customer service/support requests have been completed. Similar to the status notifications, the customer request manager 204 logs a completion notification in the data storage unit 206, which can be retrieved by the customer interface unit 202 and sent to the customer.

The manufacturer enterprise system 105 of FIG. 2A further includes an example OSSP interface unit 208 to interface with an OSSP outsourcing system, such as the OSSP outsourcing system 120. In some examples, the OSSP interface unit 208 electronically notifies (e.g., via electronic communications, such as electronic messages, emails, pages, etc., sent using the communication network 125) the OSSP outsourcing system 120 of a service order (e.g., also referred to as a repair order or a WUR order) or a support order (e.g., also referred to as a replacement order or a PFF shipment order) as determined by the customer request manager 204 in response to a customer service or support request. The OSSP interface unit 208 also electronically receives status and completion notifications (e.g., as electronic communications, such as electronic messages, emails, pages, etc., received via the communication network 125) corresponding to service/support orders being processed by the OSSP.

To perform quality control evaluations of OSSP performance, the manufacturer enterprise system 105 of FIG. 2A includes an example quality control manager 210. In some examples, the quality control manager 210 accesses the data storage unit 206 and processes logged customer service/support requests, logged service/support order notifications sent to the OSSP(s), logged status/completion notifications received from the OSSPs, etc., to determine and track service and/or support order completion times. In addition to tracking order completion times, the quality control manager 210 can also be configured to process customer feedback information to assess OSSP service and/or support quality. Other internal quality factors that can be analyzed by the quality control manager 210 include, for example, processing invoice information stored in the data storage unit 206 to determine amounts of replaced equipment not returned by customers who receive replacement equipment in response to support requests, the number of warranty claims honored by suppliers relative to the number of warranty claims rejected, etc.

To manage and provide access to the contract terms and other information defining the relationships among the product manufacturing entity, the OSSP(s), one or more suppliers, one or more 3PL provides, etc., implementing outsourced service and support for the manufacturing entity, the manufacturer enterprise system 105 of FIG. 2A includes an example contract interface unit 212 and one or more example contract term storage units 214, 216 and 218. For example, the contract interface unit 212 stores contract terms and information governing the relationship(s) between the product manufacturing entity and the OSSP(s) in a first storage unit 214. Examples of the contract terms/information stored in the storage unit 214 include, but are not limited to, service and support invoicing guidelines, inventory requirements (e.g., requirement inventory levels, if specified), quality control guidelines (e.g., target completion times), etc. For example, the contract terms/information stored in the storage unit 214 may specify how the OSSP is to invoice the product manufacturing entity for repair parts and/or replacement equipment used to satisfy customer service and/or support orders. In some examples, to account for fluctuation (e.g., devaluation) of parts and equipment costs prices over time (e.g., such as a general decrease in electronics related costs over time), the contract terms/information stored in the storage unit 214 may specify that the cost/price of repair parts and/or replacement equipment item invoiced by the OSSP are to be adjusted based on a duration of time expected to elapse from when the part/equipment was used to service a unit or was shipped to a customer and when the manufacturing entity is actually invoiced. For example, the manufacturing entity may not be invoiced until after a warranty claim has been processed by a supplier for customer-returned equipment, or until after it is determined that the customer-returned equipment is out-of-warranty and repair is not possible or economically feasible, or until after it is determined that the customer is not going to return the replaced equipment, etc., or until after any other final disposition determination is made. Although the contract terms and information governing the relationship between an OSSP and the product manufacturing entity is described as being stored the storage unit 214 in the example of FIG. 2A, such contract terms and information could alternatively be stored in the OSSP outsourcing system 120 to further decouple the product manufacturing entity from the responsibility of managing service and support logistics.

The contract interface unit 212 of FIG. 2A also stores contract terms and information governing the relationship(s) between the OSSP(s) and the supplier(s) in a second storage unit 216. The contract terms/information stored in the storage unit 216 can include negotiated costs/prices for repair parts and/or replacement equipment to be ordered/purchased by the OSSP(s) from the appropriate supplier(s). As described above, to take advantage of economies of scale and incentivize the OSSPs to engage in service and support relationships with the product manufacturing entity, the cost/prices of repair parts and/or replacement equipment to be ordered by the OSSP(s) from the supplier(s) can be reduced based on an amount (e.g., volume or quantity) of substantially identical or similar parts/equipment to be purchased by the product manufacturing entity separately for product manufacturing purposes, rather than having the costs/prices being based on just the (usually smaller) amounts (e.g., volumes/quantities) to be purchased individually by the OSSP(s). Additionally or alternatively, the product manufacturing entity could purchase repair parts and/or replacement equipment from the suppliers at pricing based on production levels, and then resell the repair parts and/or replacement equipment to the OSSP(s) to achieve economy of scale pricing. Although the contract terms and information governing the relationship between an OSSP and a supplier is described as being stored the second storage unit 216 in the example of FIG. 2A, such contract terms and information could alternatively be stored in the OSSP outsourcing system 120 and/or the supplier outsourcing system 130 to further decouple the product manufacturing entity from the responsibility of managing service and support logistics.

The contract interface unit 212 of FIG. 2A further stores contract terms and information governing the relationship(s) between the OSSP(s) and the 3PL(s) in a third storage unit 218. The contract terms/information stored in the storage unit 216 can include negotiated shipping rates for shipping whole units and/or replacement equipment between the OSSP(s) and the customers requesting service and/or support. As described above, to take advantage of economies of scale and incentivize the OSSPs to engage in service and support relationships with the product manufacturing entity, the shipping rates can be reduced based on an overall volume/quantity of shipments to/from all OSSPs providing outsourcing service and support for the product manufacturing entity, rather than having the shipping rates being based on just the (usually smaller) shipment volumes/quantities associated with each OSSP individually. Furthermore, to avoid the need for subsequent invoice reconciliation between the OSSP(s) and the product manufacturing entity, in at least some example implementations the 3PL may invoice an account number of the product manufacturing entity directly rather than invoicing each OSSP. Although the contract terms and information governing the relationship between an OSSP and a 3PL is described as being stored the second storage unit 218 in the example of FIG. 2A, such contract terms and information could alternatively be stored in the OSSP outsourcing system 120 and/or the 3PL outsourcing system 135 to further decouple the product manufacturing entity from the responsibility of managing service and support logistics.

Figure 4:
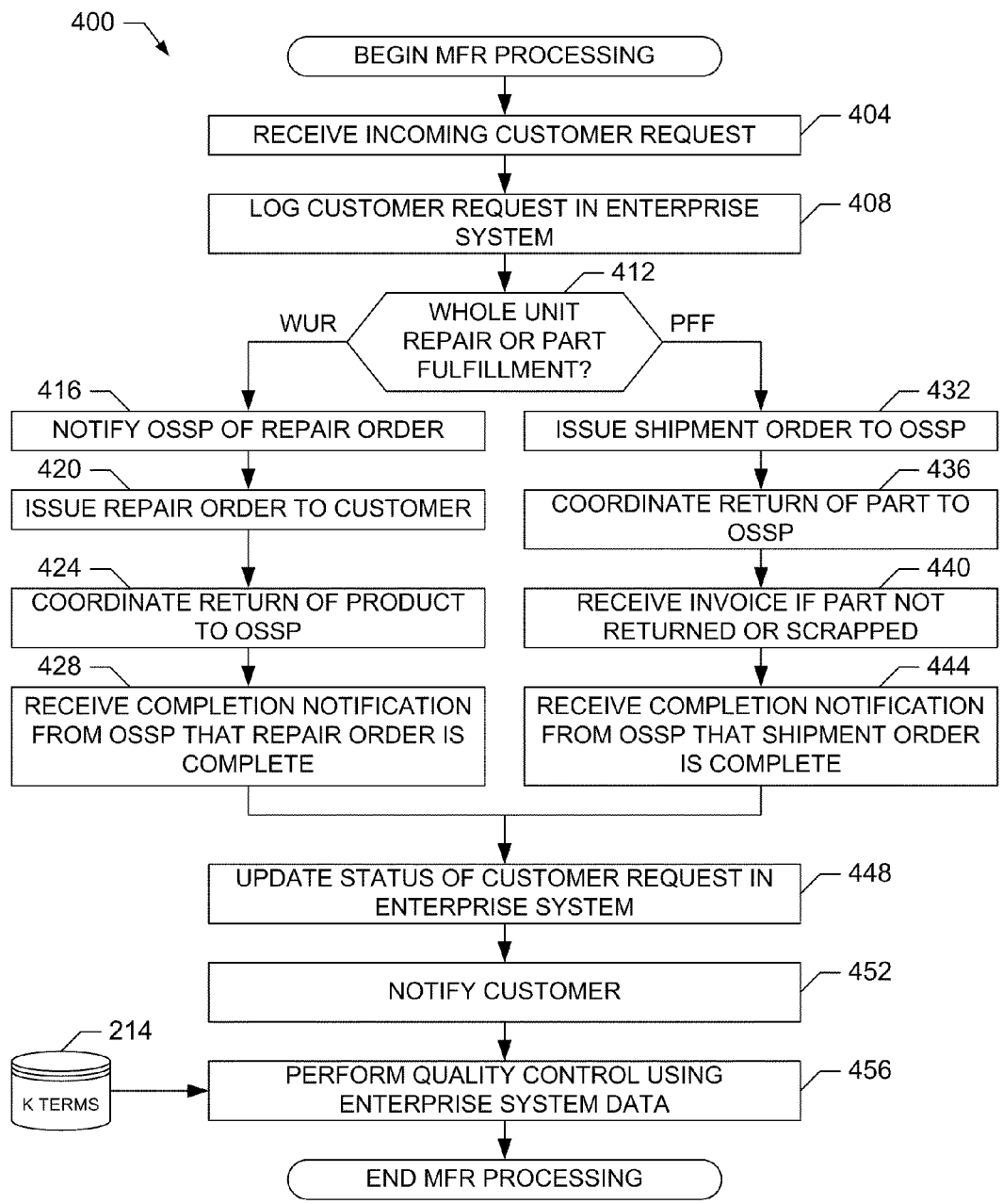
FIG. 4 is a flowchart representative of an example process that may be performed, at least in part, by the manufacturer enterprise system of FIG. 2A to implement the service and support outsourcing system of FIG. 1.

As described above, the manufacturer enterprise system 105 of FIG. 2A includes storage units 206, 214, 216 and 218. The storage units 206, 214, 216 and 218 can be implemented as a single storage unit or multiple storage units using any type of memory or storage technology. For example, one or more of the storage units 206, 214, 216 and 218 can be implemented by the mass storage device 830 and/or the volatile memory 818 of the processing system 800 of FIG. 8, which is described in greater detail below. An example process that may be used to implement and/or that may be implemented by the manufacturer enterprise system 105 of FIG. 2A is illustrated in FIG. 4, which is also described in greater detail below.

The OSSP outsourcing system 120 illustrated in FIG. 2B includes an example manufacturer interface unit 232 to interface with a manufacturer enterprise system, such as the manufacturer enterprise system 105. In some examples, the manufacturer interface unit 232 receives service and support order notifications electronically (e.g., as electronic communications, such as electronic messages, emails, pages, etc., received via the communication network 125) from the manufacturer enterprise system 105. Additionally, the manufacturer interface unit 232 sends service/support order status and completion notifications electronically (e.g., as electronic communications, such as electronic messages, emails, pages, etc., received via the communication network 125) to the manufacturer enterprise system 105.

The OSSP outsourcing system 120 illustrated in FIG. 2B also includes an example manufacturer order manager 234 to manage the processing of service and/or support orders received from the product manufacturing entity via the manufacturer interface unit 232. For example, the manufacturer order manager 234 logs orders received via the manufacturer interface unit 232 in an example data storage unit 236 and determines whether a received order is a service (repair) order for a WUR or a support (replacement) order for a PFF shipment and causes the order to be processed accordingly (e.g., as described below in connection with FIGS. 5A-C). Additionally, the manufacturer order manager 234 logs updated status of manufacturer service/support orders in the data storage unit 236 and causes appropriate status and completion notifications to be sent via the manufacturer interface unit 232. The data storage unit 236 can be implemented by any type of memory or storage technology, such as the mass storage device 830 and/or the volatile memory 818 of the processing system 800 of FIG. 8, which is described in greater detail below.

The OSSP outsourcing system 120 of FIG. 2B further includes an example inventory manager 238 to electronically manage an inventory of items, such as repair parts and/or replacement equipment, to be used by the OSSP to fulfill service/support orders received via the manufacturer interface unit 232. The inventory manager 238 manages the OSSP's inventory without intervention by the product manufacturing entity. For example, the inventory manager 238 can continuously or intermittently (e.g., periodically or aperiodically) monitor the status (e.g., quantity, location, etc. as updated manually, via automated processes, or both) of inventory items at an OSSP electronically. Depending upon the monitored status of the OSSP's inventory, the inventory manager 238 determines whether inventory items need to be replenished, scrapped (e.g., discarded/recycled due to, for example, obsolescence), relocated, etc., and causes the appropriate notifications to be issued. For example, to replenish inventory items, in some examples the inventory manager 238 causes purchase orders for the needed inventory items (e.g., repair parts, replacement equipment, etc.) to be generated and sent to the appropriate supplier(s). Additionally, the inventory manager 238 can be used to purchase inventory items (e.g., repair parts, replacement equipment, etc.) as needed to fulfill a particular service/support order if, for example, the inventory item(s) required to fulfill the order are not in-stock in the OSSP's inventory. Any, some or all of the preceding operations can be performed by the inventory manager 238 autonomously or, in other words, with input or any other intervention by the product manufacturing entity. Also, in at least some examples, some or all inventory requirements, such as required inventory levels (e.g., amounts) of inventory items (e.g., repair parts, replacement equipment, etc.) monitored by the inventory manager 238 can be specified by the OSSP autonomously or, in other words, without input or any other intervention by the product manufacturing entity.

To order inventory items from one or more suppliers as instructed by the inventory manager 238, the OSSP outsourcing system 120 of FIG. 2B includes an example supplier interface unit 240 to interface with one or more supplier outsourcing systems, such as the supplier outsourcing system 130. In some examples, the supplier interface unit 240 sends orders electronically (e.g., via electronic communications, such as electronic messages, emails, pages, etc., sent using the communication network 140) to the supplier outsourcing system 130 to order/purchase inventory items to replenish the OSSPs inventory and/or to fulfill particular service/support orders. An example contract interface unit 242 included in the OSSP outsourcing system 120 can be used to electronically access (e.g., via the communication network 125) the storage unit 216 in the manufacturer enterprise system 105 to retrieve the costs/prices for the inventory items to be ordered. Alternatively, the contract interface unit 242 can retrieve the cost/pricing information from local storage (e.g., such as the storage unit 236) if, in an example implementation, the manufacturer enterprise system 105 does not include the storage unit 216 to store this information.

To coordinate shipping of whole units and/or replacement equipment between customers and the OSSP, the OSSP outsourcing system 120 of FIG. 2B also includes an example 3PL interface unit 244 to interface with one or more 3PL outsourcing systems, such as the 3PL outsourcing system 135. In some examples, the 3PL interface unit 244 sends shipping requests electronically (e.g., via electronic communications, such as electronic messages, emails, pages, etc., sent using the communication network 150) to the 3PL outsourcing system 135 to coordinate shipping of units and/or equipment to/from the OSSP. The contract interface unit 242 included in the OSSP outsourcing system 120 can be used to electronically access (e.g., via the communication network 125) the storage unit 218 in the manufacturer enterprise system 105 to retrieve the shipping rates for the units/equipment being shipped. Additionally, the contract interface unit 242 can be used to determine whether the contract terms/information stored in the storage unit 218 indicate that the shipping labels are to use the product manufacturing entity's name instead of the OSSP's name (although the OSSP's address is still listed on the shipping label) to provide customers with a consistent service and support experience, prevent disclosure of the name of the OSSP performing the service/support, etc. Alternatively, the contract interface unit 242 can retrieve the shipping rates and other shipping information from local storage (e.g., such as the storage unit 236) if, in an example implementation, the manufacturer enterprise system 105 does not include the storage unit 218 to store this information.

Figure 5A:
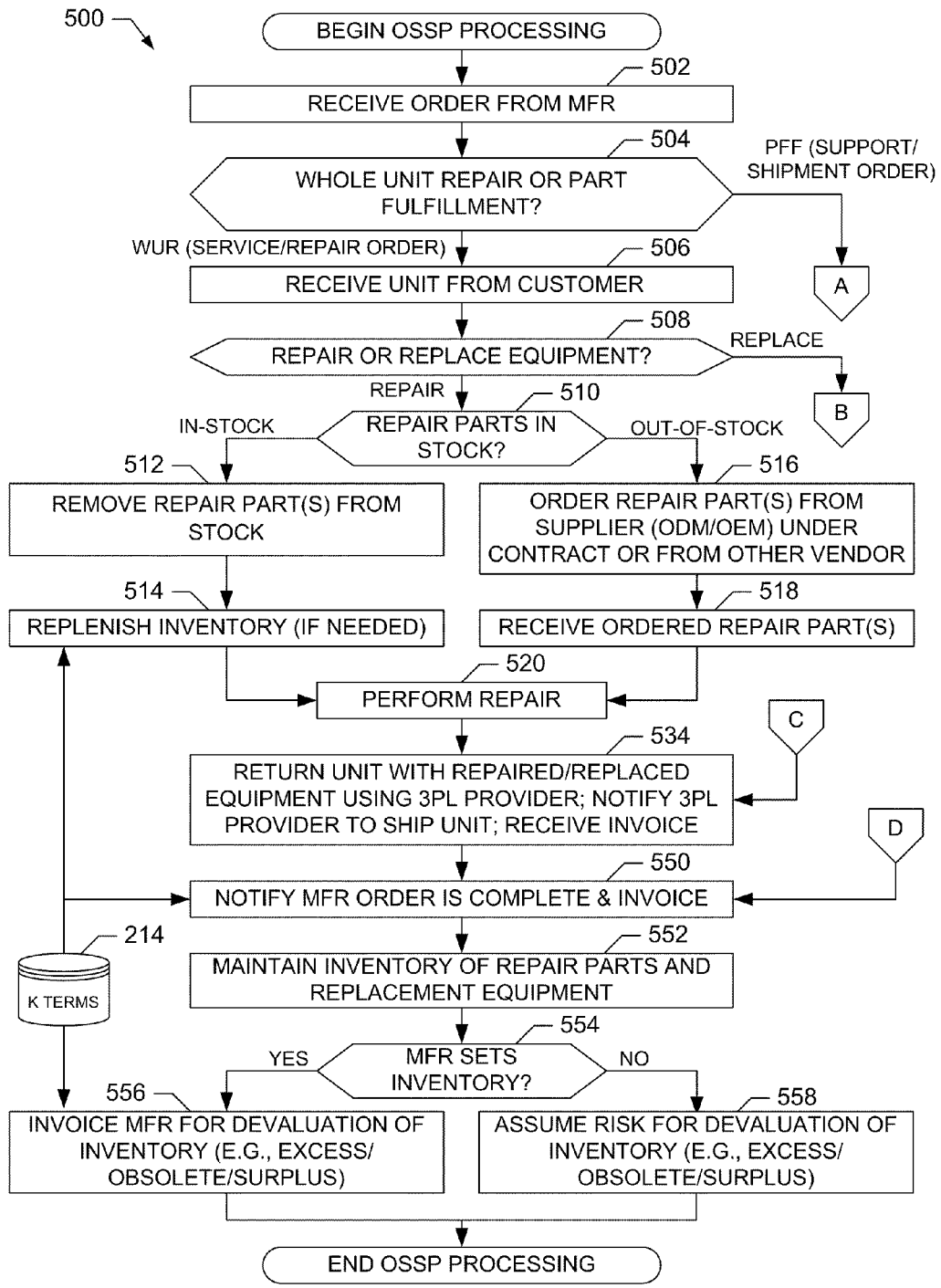
FIGS. 5A-C collectively form a flowchart representative of an example process that may be performed, at least in part, by the OSSP outsourcing system of FIG. 2B to implement the service and support outsourcing system of FIG. 1.
Figure 5B:
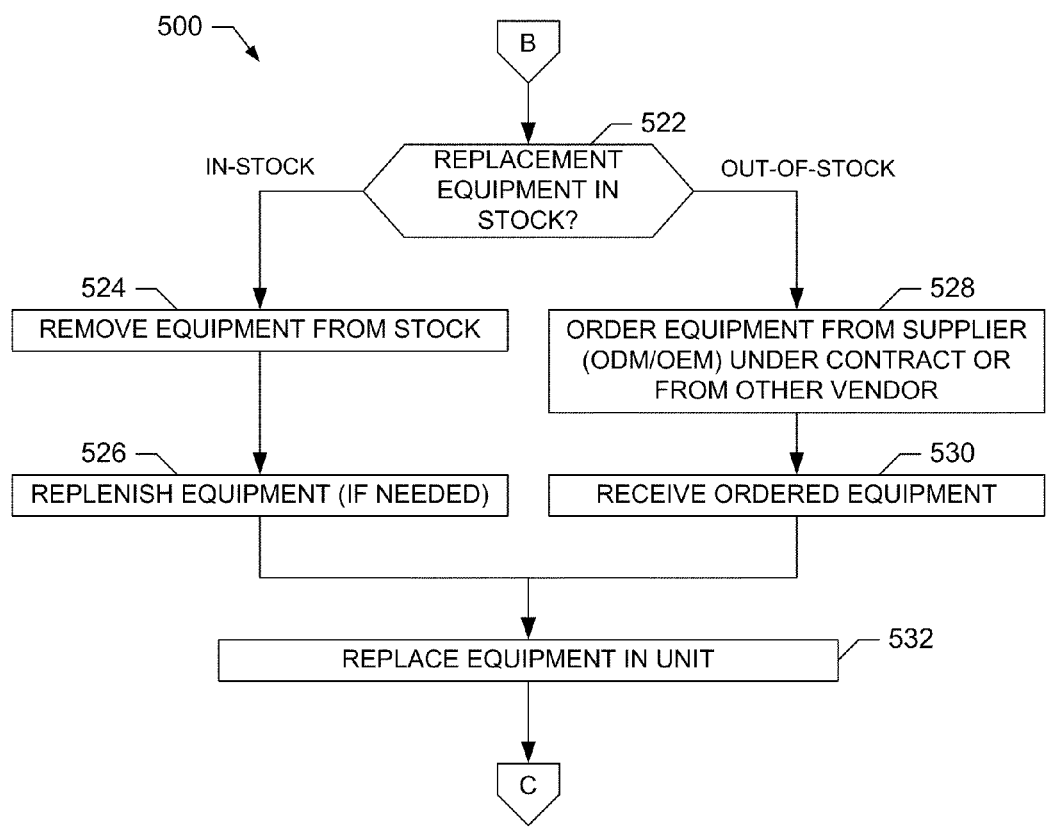
Figure 5C:
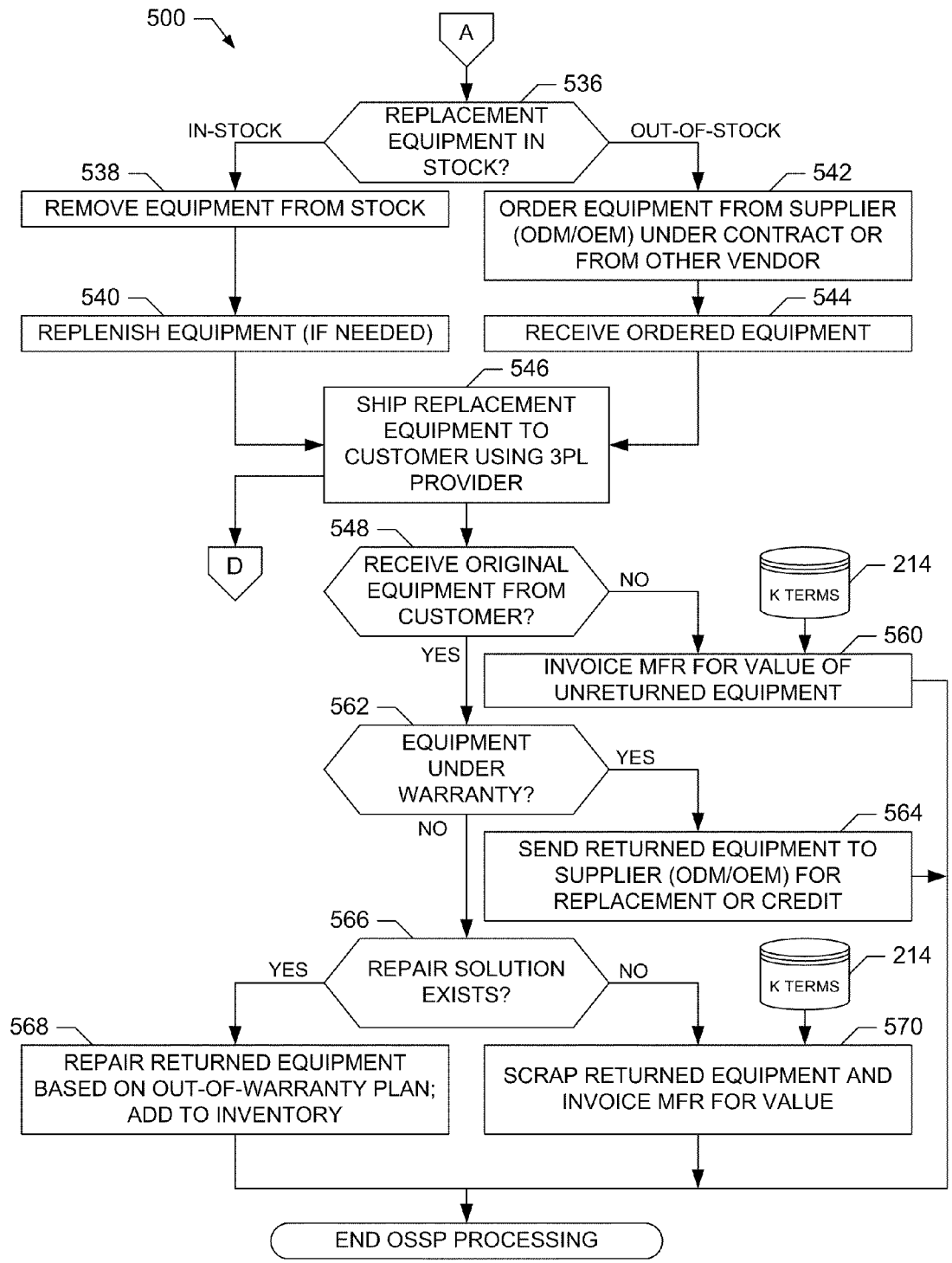

An example manufacturer invoicing unit 246 is included in the OSSP outsourcing system 120 of FIG. 2B to enable the OSSP to invoice (e.g., electronically) the product manufacturing entity for fulfilling outsourced service and support orders. In some examples, the contract interface unit 242 included in the OSSP outsourcing system 120 is used to electronically access (e.g., via the communication network 125) the storage unit 214 in the manufacturer enterprise system 105 to retrieve the terms under which the manufacturing entity is to be invoiced by the OSSP. Alternatively, the contract interface unit 242 can retrieve the invoicing terms information from local storage (e.g., such as the storage unit 236) if, in an example implementation, the manufacturer enterprise system 105 does not include the storage unit 214 to store this information. The manufacturer invoicing unit 246 then generates the invoice based on the retrieved terms and causes the invoice to be transmitted electronically to the manufacturer enterprise system 105 via the manufacturer interface unit 232 for subsequent review and payment by the product manufacturing entity. Example operation of the manufacturer invoicing unit 246 is described in greater detail below in connections with FIGS. 5A-C. An example process that may be used to implement and/or that may be implemented by the OSSP outsourcing system 120 of FIG. 2B is illustrated in FIGS. 5A-C, which is described in greater detail below.

The supplier outsourcing system 130 illustrated in FIG. 2C includes an example OSSP interface unit 262 to interface with one or more OSSP outsourcing systems, such as the OSSP outsourcing system 120, to receive orders from the OSSP(s) for inventory items (e.g., such as repair part and/or replacement equipment). In some examples, the OSSP interface unit 262 receives orders electronically (e.g., via electronic communications, such as electronic messages, emails, pages, etc., sent using the communication network 140) from the OSSP outsourcing system 120. The orders can be logged electronically in an example data storage unit 264. An example contract interface unit 266 included in the supplier outsourcing system 130 can be used to electronically access (e.g., via the communication network 145) the storage unit 216 in the manufacturer enterprise system 105 to retrieve the costs/prices for the inventory items being ordered by the OSSP(s). Alternatively, the contract interface unit 266 can retrieve the cost/pricing information from local storage (e.g., such as the storage unit 254) or from the OSSP outsourcing system 120 if, in an example implementation, the manufacturer enterprise system 105 does not include the storage unit 216 to store this information. To invoice OSSP(s) when orders are fulfilled, the supplier outsourcing system 130 includes an example OSSP invoicing unit 268 to generate an invoice and cause the invoice to be sent electronically via the OSSP interface unit 262 to the appropriate OSSP. The data storage unit 264 can be implemented by any type of memory or storage technology, such as the mass storage device 830 and/or the volatile memory 818 of the processing system 800 of FIG. 8, which is described in greater detail below.

Figure 6:
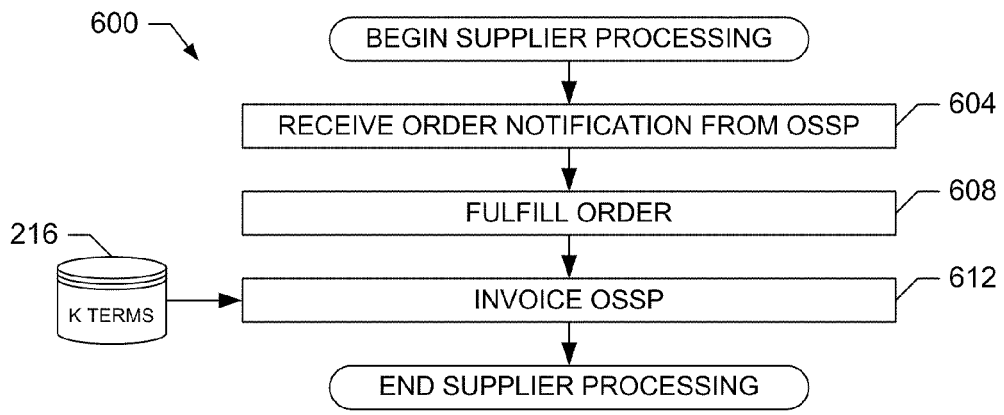
FIG. 6 is a flowchart representative of an example process that may be performed, at least in part, by the supplier outsourcing system of FIG. 2C to implement the service and support outsourcing system of FIG. 1.

The supplier outsourcing system 130 of FIG. 2C also includes an example warranty servicing unit 270. In some examples, the warranty servicing unit 270 receives warranty claims from OSSP(s). The warranty servicing unit 270 evaluates whether the part, equipment, etc., for which a warranty claim is being made is still covered under warranty. For example, the warranty servicing unit 270 may retrieve warranty terms, purchase/in-service dates, etc., from the data storage unit 264 and compare this information with the date when and conditions under which the warranty claim is made to determine whether the warranty should be honored. Furthermore, if the warranty is honored, the warranty servicing unit 270 can also evaluate warranty terms, such as depreciation, crediting terms, etc., to determine whether to provide a replacement or issue a credit to the OSSP for the part/equipment covered under the warranty. An example process that may be used to implement and/or that may be implemented by supplier outsourcing system 130 of FIG. 2C is illustrated in FIG. 6, which is described in greater detail below.

The 3PL outsourcing system 135 illustrated in FIG. 2D includes an example order interface unit 282 to interface with one or more OSSP outsourcing systems, such as the OSSP outsourcing system 120, to coordinate shipping of whole units (e.g., entire products) and/or replacement equipment between the OSSP(s) and one or more customers. In some examples, the order interface unit 282 receives shipping requests electronically (e.g., as electronic communications, such as electronic messages, emails, pages, etc., received via the communication network 150) from the OSSP outsourcing system 120 to coordinate shipping of units and/or equipment to/from the OSSP. The order interface unit 282 may also interface directly with customers via, for example, the communication network 155 to enable customers to coordinate shipping and perform tracking of their units and/or replacement equipment. The shipping requests can be logged electronically in an example data storage unit 284.

Figure 7:
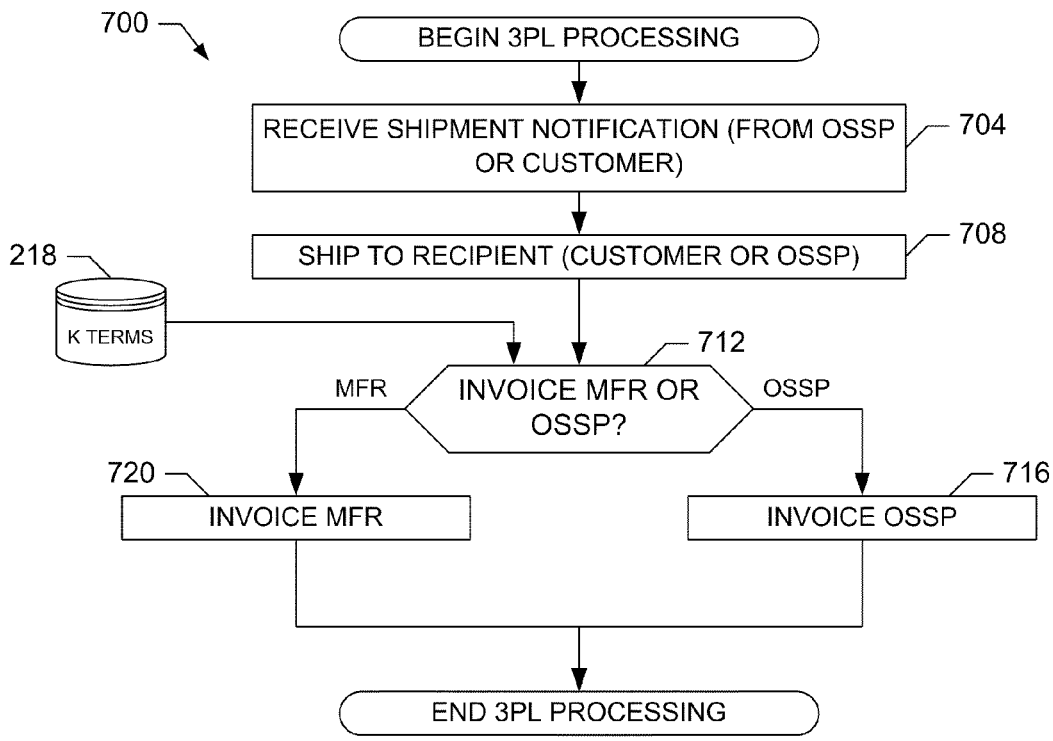
FIG. 7 is a flowchart representative of an example process that may be performed, at least in part, by the 3PL outsourcing system of FIG. 2D to implement the service and support outsourcing system of FIG. 1.

An example contract interface unit 286 included in the 3PL outsourcing system 135 can be used to electronically access (e.g., via the communication network 160) the storage unit 218 in the manufacturer enterprise system 105 to retrieve the shipping rates associated with the OSSP(s). Alternatively, the contract interface unit 286 can retrieve the shipping rate information from local storage (e.g., such as the storage unit 284) or from the OSSP outsourcing system 120 if, in an example implementation, the manufacturer enterprise system 105 does not include the storage unit 218 to store this information. The shipping rates may be determined (e.g., negotiated) among the OSSP(s) and the 3PL provider, or may be based on shipping rates already determined for any shipping associated with the product manufacturing entity. Also, in at least some examples, the 3PL provider may invoice an account number of the product manufacturing entity directly rather than invoicing the OSSP to avoid an additional invoice reconciliation that would be needed between the OSSP and the product manufacturing entity. To invoice OSSP(s) when orders are shipped, the 3PL outsourcing system 135 includes an example OSSP invoicing unit 288 to generate an invoice and cause the invoice to be sent electronically via the order interface unit 282 to the appropriate OSSP. The data storage unit 284 can be implemented by any type of memory or storage technology, such as the mass storage device 830 and/or the volatile memory 818 of the processing system 800 of FIG. 8, which is described in greater detail below. An example process that may be used to implement and/or that may be implemented by 3PL outsourcing system 135 of FIG. 2D is illustrated in FIG. 7, which is described in greater detail below.

While example manners of implementing the example service and support outsourcing system 100, the example OSSP outsourcing system 120, the example supplier outsourcing system 130 and the example 3PL outsourcing system 135 have been illustrated in FIGS. 1 and 2A-D, one or more of the elements, processes and/or devices illustrated in FIGS. 1 and/or 2A-D may be combined, divided, re-arranged, omitted, eliminated and/or implemented in any other way. Further, any, some or all of the example customer interface unit 202, the example customer request manager 204, the example data storage unit 206, the example OSSP interface unit 208, the example quality control manager 210, the example contract interface unit 212, the example storage units 214-218, the example manufacturer interface unit 232, the example manufacturer order manager 234, the example data storage unit 236, the example inventory manager 238, the example supplier interface unit 240, the example contract interface unit 242, the example 3PL interface unit 244, the example manufacturer invoicing unit 246, the example OSSP interface unit 262, the example data storage unit 264, the example contract interface unit 266, the example OSSP invoicing unit 268, the example warranty servicing unit 270, the example order interface unit 282, the example data storage unit 284, the example contract interface unit 286, the example OSSP invoicing unit 288 and/or, more generally, the example OSSP outsourcing system 120, the example supplier outsourcing system 130, the example 3PL outsourcing system 135 and/or the example service and support outsourcing system 100 of FIGS. 1 and 2A-D may be implemented by hardware, software, firmware and/or any combination of hardware, software and/or firmware. Thus, for example, any, some or all of the example customer interface unit 202, the example customer request manager 204, the example data storage unit 206, the example OSSP interface unit 208, the example quality control manager 210, the example contract interface unit 212, the example storage units 214-218, the example manufacturer interface unit 232, the example manufacturer order manager 234, the example data storage unit 236, the example inventory manager 238, the example supplier interface unit 240, the example contract interface unit 242, the example 3PL interface unit 244, the example manufacturer invoicing unit 246, the example OSSP interface unit 262, the example data storage unit 264, the example contract interface unit 266, the example OSSP invoicing unit 268, the example warranty servicing unit 270, the example order interface unit 282, the example data storage unit 284, the example contract interface unit 286, the example OSSP invoicing unit 288 and/or, more generally, the example OSSP outsourcing system 120, the example supplier outsourcing system 130, the example 3PL outsourcing system 135 and/or the example service and support outsourcing system 100 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any of the appended system claims are read to cover a purely software and/or firmware implementation, at least one of the example service and support outsourcing system 100, the example OSSP outsourcing system 120, the example supplier outsourcing system 130, the example 3PL outsourcing system 135, the example customer interface unit 202, the example customer request manager 204, the example data storage unit 206, the example OSSP interface unit 208, the example quality control manager 210, the example contract interface unit 212, the example storage units 214-218, the example manufacturer interface unit 232, the example manufacturer order manager 234, the example data storage unit 236, the example inventory manager 238, the example supplier interface unit 240, the example contract interface unit 242, the example 3PL interface unit 244, the example manufacturer invoicing unit 246, the example OSSP interface unit 262, the example data storage unit 264, the example contract interface unit 266, the example OSSP invoicing unit 268, the example warranty servicing unit 270, the example order interface unit 282, the example data storage unit 284, the example contract interface unit 286 and/or the example OSSP invoicing unit 288 are hereby expressly defined to include a tangible medium such as a memory, digital versatile disk (DVD), compact disk (CD), etc., storing such software and/or firmware. Further still, the example service and support outsourcing system 100, the example OSSP outsourcing system 120, the example supplier outsourcing system 130 and/or the example 3PL outsourcing system 135 of FIGS. 1 and 2A-D may include one or more elements, processes and/or devices in addition to, or instead of, those illustrated in FIGS. 1 and 2A-D, and/or may include more than one of any or all of the illustrated elements, processes and devices.

Flowcharts representative of example processes that may be executed to implement the example service and support outsourcing system 100, the example OSSP outsourcing system 120, the example supplier outsourcing system 130, the example 3PL outsourcing system 135, the example customer interface unit 202, the example customer request manager 204, the example data storage unit 206, the example OSSP interface unit 208, the example quality control manager 210, the example contract interface unit 212, the example storage units 214-218, the example manufacturer interface unit 232, the example manufacturer order manager 234, the example data storage unit 236, the example inventory manager 238, the example supplier interface unit 240, the example contract interface unit 242, the example 3PL interface unit 244, the example manufacturer invoicing unit 246, the example OSSP interface unit 262, the example data storage unit 264, the example contract interface unit 266, the example OSSP invoicing unit 268, the example warranty servicing unit 270, the example order interface unit 282, the example data storage unit 284, the example contract interface unit 286 and/or the example OSSP invoicing unit 288 are shown in FIGS. 3-7. In these examples, the process represented by each flowchart may be automated and implemented by one or more programs comprising machine readable instructions for execution by: (a) a processor, such as the processor 812 shown in the example processing system 800 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 812, but the entire program or programs and/or portions thereof could alternatively be executed by a device other than the processor 812 and/or embodied in firmware or dedicated hardware (e.g., implemented by an application specific integrated circuit (ASIC), a programmable logic device (PLD), a field programmable logic device (FPLD), discrete logic, etc.). Also, some or all of the processes represented by the flowcharts of FIGS. 3-7 may be implemented manually. Further, although the example processes are described with reference to the flowcharts illustrated in FIGS. 3-7, many other techniques for implementing the example methods and systems described herein may alternatively be used. For example, with reference to the flowcharts illustrated in FIGS. 3-7, the order of execution of the blocks may be changed, and/or some of the blocks described may be changed, eliminated, combined and/or subdivided into multiple blocks.

Figure 3:
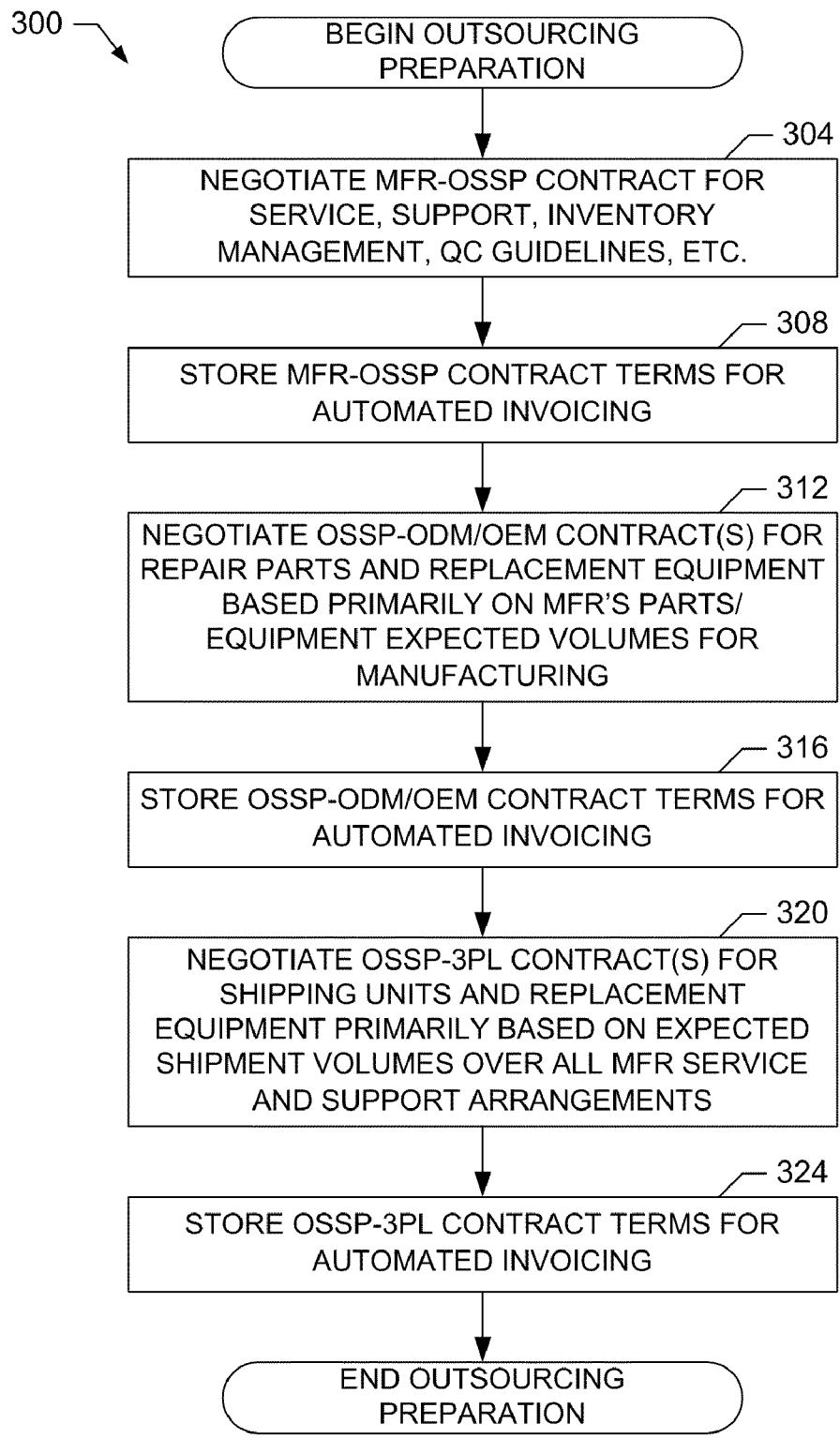
FIG. 3 is a flowchart representative of an example outsourcing preparation process that may be used to implement the service and support outsourcing system of FIG. 1.

An example process 300 that may be performed to prepare the contract terms (and any other information) governing the relationships between entities in the example service and support outsourcing system 100 of FIG. 1 is illustrated in FIG. 3. With reference to FIGS. 1 and 2A-D, the example process 300 of FIG. 3 begins at block 304 at which the product manufacturing entity and each OSSP negotiate and determine contract terms and/or other information governing their outsourced service and support agreement. Such terms/information can include, for example, service and support invoicing guidelines, inventory management guidelines, quality control guidelines, service level metrics, incentives and/or penalties, etc. At block 308, the contract interface unit 212 included in the manufacturer enterprise system 105 stores the contract terms and other agreement information determined at block 304 in the storage unit 214 included in the manufacturer enterprise system 105. Alternatively, the contract terms and other agreement information determined at block 308 can be stored locally in the OSSP outsourcing system 120 (e.g., in the data storage unit 236).

At block 312, each OSSP and supplier (e.g., OEM, ODM, etc.) negotiates and determines contract terms and/or other information governing their outsourced service and support agreement. Such terms/information include, for example, costs/prices for repair parts and/or replacement equipment to be ordered/purchased by the OSSP from the supplier, with the costs/prices based primarily on volumes/quantities to be purchased by the product manufacturing entity. To avoid involvement in contract negotiations between the OSSP and the supplier, the product manufacturing entity can send a letter of agency or other authorization or notification to the supplier to indicate that the OSSP is associated with the product manufacturing entity and, thus, should be able to benefit from the product manufacturing entity purchasing amounts. At block 316, the contract interface unit 212 included in the manufacturer enterprise system 105 stores the contract terms and other agreement information determined at block 312 in the storage unit 216 included in the manufacturer enterprise system 105. Alternatively, the contract terms and other agreement information determined at block 312 can be stored locally in the OSSP outsourcing system 120 (e.g., in the data storage unit 236) and/or the supplier outsourcing system 130 (e.g., in the data storage unit 264).

At block 320, each OSSP and 3PL provider negotiates and determines contract terms and/or other information governing their outsourced service and support agreement. Such terms/information include, for example, shipping rates for shipping whole units and/or replacement equipment between the OSSP(s) and the customers requesting service and/or support, with the shipping rates based primarily on aggregate shipping volumes/quantities over all OSSPs, or based on shipping rates negotiated for any shipping related to the product manufacturing entity (e.g., and to be billed directly to the product manufacturing entity). At block 324, the contract interface unit 212 included in the manufacturer enterprise system 105 stores the contract terms and other agreement information determined at block 320 in the storage unit 218 included in the manufacturer enterprise system 105. Alternatively, the contract terms and other agreement information determined at block 320 can be stored locally in the OSSP outsourcing system 120 (e.g., in the data storage unit 236) and/or the supplier outsourcing system 130 (e.g., in the data storage unit 284). The process 300 then ends.

An example process 400 that may be performed to implement at least portions of the manufacturer enterprise system 105 of FIGS. 1 and/or 2A is illustrated in FIG. 4. With reference to FIGS. 1 and 2A-D, the example process 400 of FIG. 4 begins at block 404 at which the customer interface unit 202 included in the manufacturer enterprise system 105 receives a service or support request from a customer. At block 408, the customer request manager 204 logs the received customer request in the data storage unit 206 included in the manufacturer enterprise system 105. At block 412, the customer request manager 204 also determines whether the customer request corresponds to a service request (e.g., requiring a whole unit repair (WUR)) or a support request (e.g., requiring a part fulfillment (PFF) response).

If the customer request corresponds to a service request (block 412), then at block 416 the customer request manager 204 automatically causes the OSSP interface unit 208 included in the manufacturer enterprise system 105 to send a service (repair) order notification to the OSSP outsourcing system 120. The customer request manager 204 also automatically causes the customer interface unit 202 to send a service/repair order confirmation to the customer at block 420. At block 424, the customer request manager 204 causes the customer interface unit 202 to send shipping instructions and/or other shipping logistics information to the customer describing the procedure for returning the customer's unit for repair. Alternatively, coordinating of the return of the customer's unit for repair can be performed by the OSSP via its OSSP outsourcing system 120. Also, such coordination of the return of the customer's unit for repair can include coordinating with a 3PL provider to ship an appropriate box or container to the customer to be used to return the equipment, with the box/container addressed to the appropriate OSSP but with the listed addressee's name being that of the product manufacturing entity (to provide the customer with a single point-of-contact rather than multiple entities). In at least some examples, blocks 404-412 and 416-424 are automated and performed automatically (without human intervention). At a later time, at block 428 the OSSP interface unit 208 electronically receives a completion notification from the OSSP outsourcing system 120 indicating that the service/repair order initiated at block 416 is complete, which is logged by the customer request manager 204 in the data storage unit 206.

Returning to block 412, if the customer request corresponds to a support request, then at block 432 the customer request manager 204 automatically causes the OSSP interface unit 208 to send a support (replacement) order to the OSSP outsourcing system 120. At block 436, the customer request manager 204 automatically causes the customer interface unit 202 to send shipping instructions and/or other shipping logistics information to the customer describing the procedure for returning the faulty equipment being self-replaced by the customer. Alternatively, coordinating of the return of this equipment can be performed by the OSSP via its OSSP outsourcing system 120. For example, the shipping instructions may indicate that the customer is to return the faulty equipment in the same packaging that was used to send the replacement equipment to the customer. At block 436, the customer request manager 204 may also automatically cause a customer support confirmation to be sent via the customer interface unit 202. In at least some examples, blocks 432-436 are automated and performed automatically (without human intervention).

At a later time, at block 440 the OSSP interface unit 208 electronically receives an invoice from the OSSP outsourcing system 120 if the customer fails to return the replaced equipment or the replaced equipment is scrapped and/or not covered under warranty. At block 444, the OSSP interface unit 208 electronically receives a completion notification from the OSSP outsourcing system 120 indicating that the support/replacement order initiated at block 432 is complete, which is logged by the customer request manager 204 in the data storage unit 206.

At block 448, the customer request manager 204 updates the status of the service/support order initiated at block 416 or 432 based on the completion notification received at block 428 or 444. At block 452, the customer request manager 204 causes the customer interface unit 202 to electronically send a notification to the customer indicating that the customer's service/support request has been fulfilled (and possibly also requesting customer feedback for quality control purposes). At block 456, the quality control manager 210 included in the manufacturer enterprise system 105 retrieves information stored in the data storage unit 206 by the customer request manager 204 and, as described above, performs quality control evaluations according to the contract terms and/or other agreement guidelines stored in the storage unit 214. In at least some examples, blocks 448-456 are automated and performed automatically (without human intervention). The process 400 then ends.

An example process 500 that may be performed to implement at least portions of the OSSP outsourcing system 120 of FIGS. 1 and/or 2B is illustrated in FIGS. 5A-C. With reference to FIGS. 1 and 2A-D, the example process 500 begins at block 502 of FIG. 5A at which the manufacturer interface unit 232 included in the OSSP outsourcing system 120 receives a service (repair) or support (replacement) order notification electronically from the manufacturer enterprise system 105. At block 504, the manufacturer order manager 234 included in the OSSP outsourcing system 120 determines whether the order notification received from the manufacturer enterprise system 105 at block 502 corresponds to a service (repair) order for a WUR or a support (replacement) order for a PFF shipment. At a later time, if the received order notification corresponds to a service (repair) order for a WUR (block 504), the OSSP receives the customer's unit for repair as shipped by the 3PL provider. For example, the product manufacturing entity may have used its manufacturer enterprise system 105 as described above to coordinate shipping of the customer's unit from the customer to the OSSP. Alternatively, the OSSP outsourcing system 120 can perform such coordination, as described above.

After the OSSP receives the customer's unit (block 506), the OSSP attempts to replicate the customer's reported problem to determine how to repair the unit. For example, the OSSP may determine whether to replace or repair equipment in the unit to resolve the problem (block 508). Generally, replacing equipment involves removing a faulty piece of equipment (e.g., such as replacing a motherboard, power supply, disk drive, etc., in a computer) and inserting a completely different replacement, whereas repairing equipment involves using repair parts to repair existing equipment in the unit (e.g., such as repairing chips, capacitors, resistors, connectors, etc. on a motherboard) without replacing the pre-existing equipment (e.g., the motherboard) in its entirety. If, for example, the OSSP determines that equipment can be repaired to resolve the problem (block 508), then at block 510 the inventory manager 238 included in the OSSP outsourcing system 120 determines whether the required repair parts are in-stock in the OSSP inventory (block 510). Such a determination may be automated and performed automatically by consulting a database, a spreadsheet, a list, etc., of inventory items maintained by the inventory manager 238 in the data storage unit 236 included in the OSSP outsourcing system 120.

If the required repair part(s) are in-stock (block 510), then the required repair parts are removed from the inventory stock (block 512). The inventory manager 238 then determines whether new repair parts need to be ordered to replenish the repair parts removed from the inventory stock. For example, the inventory manager 238 can evaluate required inventory levels for repair parts specified internally by the OSSP and/or externally by the product manufacturing entity via contract terms and/or other agreement information retrieved from data storage unit 214 included in the manufacturer enterprise system 105 and/or stored locally in the OSSP outsourcing system 120 (block 514). If new repair parts need to be ordered, then at block 514 the supplier interface unit 240 sends one or more orders electronically to the supplier outsourcing system(s) 130 of the supplier(s) from which the new repair parts are to be ordered. Returning to block 510, if the required repair parts are not in-stock, then the inventory manager 238 causes the supplier interface unit 240 to send one or more orders electronically to the supplier outsourcing system(s) 130 of the supplier(s) from which the out-of-stock repair parts are to be ordered (block 516). At a later time, the OSSP receives the ordered repair parts from the supplier(s) (block 518). Typically, needing to order out-of-stock parts at block 516 is less desirable than being able to remove the repair parts from inventory stock at block 512 because of the additional service delay that may be incurred waiting for the supplier(s) to ship the out-of-stock parts. Next, with the repair parts obtained at block 512 or 516, an OSSP technician then repairs the customer's unit (block 520).

Returning to block 508, if, for example, the OSSP determines that equipment is to be replaced to resolve the problem, then at block 522 of FIG. 5B the inventory manager 238 determines whether the required replacement equipment is in-stock in the OSSP inventory. As mentioned above, such a determination may be automated and performed automatically by consulting a database, a spreadsheet, a list, etc., of inventory items maintained by the inventory manager 238 in the data storage unit 236. If the required replacement equipment is in-stock (block 522), then the required replacement equipment is removed from the inventory stock (block 524). The inventory manager 238 then determines whether new equipment needs to be ordered to replenish the replacement equipment removed from the inventory stock by, for example, evaluating required inventory levels for replacement equipment specified internally by the OSSP and/or externally by the product manufacturing entity (block 526). If new equipment needs to be ordered, then at block 526 the supplier interface unit 240 sends one or more orders electronically to the supplier outsourcing system(s) 130 of the supplier(s) from which the new equipment is to be ordered.

Returning to block 522, if the required replacement equipment is not in-stock, then the inventory manager 238 causes the supplier interface unit 240 to send one or more orders electronically to the supplier outsourcing system(s) 130 of the supplier(s) from which the out-of-stock replacement equipment to be ordered (block 528). At a later time, the OSSP receives the ordered replacement equipment from the supplier(s) (block 530). As noted above, needing to order out-of-stock equipment at block 528 is typically less desirable than being able to remove the replacement equipment from inventory stock at block 524 because of the additional service delay that may be incurred waiting for the supplier(s) to ship the out-of-stock equipment. Next, with the replacement equipment obtained at block 524 or 528, the OSSP then services the customer's unit by replacing the equipment (block 532). After the customer's unit is serviced at block 520 or 532, at block 534 of FIG. 5A the 3PL interface unit 244 included in the OSSP outsourcing system 120 sends (e.g., electronically) a shipping request to the 3PL outsourcing system 135 of the appropriate 3PL provider to notify the 3PL provider that the serviced unit needs to be shipped back to the customer. At a later time after the serviced unit has been shipped, the 3PL interface unit 244 receives an invoice from the 3PL provider at the appropriate shipping rate (e.g., if the product manufacturing entity is not invoiced directly by the 3PL provider using, for example, the product manufacturing entity's account number with the 3PL provider).

Returning to block 504, if the order notification received from the product manufacturing entity corresponds to a support (replacement) order for a PFF shipment, then at block 536 of FIG. 5C the inventory manager 238 determines whether the required replacement equipment to be shipped to the customer for self-repair is in-stock in the OSSP inventory. As mentioned above, such a determination may be automated and performed automatically by consulting a database, a spreadsheet, a list, etc., of inventory items maintained by the inventory manager 238 in the data storage unit 236. If the required replacement equipment is in-stock (block 536), then the required replacement equipment is removed from the inventory stock (block 538). The inventory manager 238 then determines whether new equipment needs to be ordered to replenish the replacement equipment removed from the inventory stock by, for example, evaluating required inventory levels for replacement equipment specified internally by the OSSP and/or externally by the product manufacturing entity (block 540). If new equipment needs to be ordered, then at block 540 the supplier interface unit 240 sends one or more orders electronically to the supplier outsourcing system(s) 130 of the supplier(s) from which the new equipment is to be ordered.

Returning to block 536, if the required replacement equipment is not in-stock, then the inventory manager 238 causes the supplier interface unit 240 to send one or more orders electronically to the supplier outsourcing system(s) 130 of the supplier(s) from which the out-of-stock replacement equipment to be ordered (block 542). At a later time, the OSSP receives the ordered replacement equipment from the supplier(s) (block 544). As noted above, needing to order out-of-stock equipment at block 542 is typically less desired than being able to remove the replacement equipment from inventory stock at block 538 because of the additional support delay that may be incurred waiting for the supplier(s) to ship the out-of-stock equipment. Next, with the replacement equipment obtained at block 538 or 542, the 3PL interface unit 244 included in the OSSP outsourcing system 120 sends a shipping request to the 3PL outsourcing system 135 of the appropriate 3PL provider to notify the 3PL provider that the replacement equipment needs to be shipped to the customer (block 546). At a later time after the replacement equipment has been shipped, the 3PL interface unit 244 receives an invoice from the 3PL provider at the appropriate shipping rate (e.g., if the product manufacturing entity is not invoiced directly by the 3PL provider using, for example, the product manufacturing entity's account number with the 3PL provider).

After block 546, the process 500 proceeds in two parallel paths as shown, with one path proceeding to block 548 and the other path proceeding to block 550 of FIG. 5A. Turning to FIG. 5A, at block 550 the manufacturer order manager 234 generates a service (repair) order completion notification after the serviced unit has been returned to the customer at block 534 or a support (replacement) order completion notification after the replacement equipment has been shipped to the customer at block 546 of FIG. 5C. The completion notification is sent to the manufacturer enterprise system 105 via the manufacturer interface unit 232. At the same time and/or a later time (e.g., after any warranty claims have been processed, replaced equipment returned by the customer, etc.), the manufacturer invoicing unit 246 included in the OSSP outsourcing system 120 generates an invoice for labor, cost of repair parts and/or replacement equipments, processing fees, 3PL shipping, etc. based on the contract terms and agreement information stored in the storage unit 214 and/or stored locally in the OSSP outsourcing system 120. For example, the manufacturer invoicing unit 246 may invoice the product manufacturing entity for outbound and inbound transactional costs associated with shipment of replacement equipment to/from customer at the time of shipment, but may wait to invoice the product manufacturing entity for the cost/price of the used repair parts and replacement equipment until final disposition of such part/equipment. As noted above, to account for fluctuations (e.g., devaluation) in the cost/price of repair parts and replacement equipment (the cost/price of which generally decreases over time in the case of electronic parts and equipment), the contract terms/information stored in the storage unit 214 and/or locally in the OSSP outsourcing system 120 may specify that the cost/price of repair parts and/or replacement equipment item invoiced by the OSSP are to be adjusted based on a duration of time expected to elapse from when the part/equipment was used to service a unit or was shipped to a customer and when the manufacturing entity is actually invoiced, which may not occur until after final disposition, such as after warranty claims have been processed by suppliers and/or customers have returned replaced equipment. Such an adjustment attempts to compensate the OSSP for the parts/equipment at a cost/price corresponding to a time at least close to when the parts/equipment were actually purchased, rather than the cost/price at the more recent time when the OSSP invoices the product manufacturing entity.

At block 552, the inventory manager 238 electronically manages the OSSP's inventory of items (e.g., repair parts and/or replacement equipment) as described above. If new inventory items need to be ordered to replenish the inventory, the inventory manager 238 causes the supplier interface unit 240 to send one or more orders electronically to the supplier outsourcing system(s) 130 of the supplier(s) from which the new parts/equipment is to be ordered. The inventory manager 238 also determines whether any unused inventory items need to be scrapped or otherwise removed due to obsolescence, age, excess, surplus, etc. If the product manufacturing entity sets inventory requirements for the OSSP (e.g., via the contract terms or other agreement information stored in the storage unit 214 and/or locally in the OSSP outsourcing system 120) (block 554), then the manufacturer invoicing unit 246 can also invoice the product manufacturing entity for the devaluation of this unused inventory (block 556). For example, if the product manufacturing entity sets certain inventory requirements, contract terms or other agreement information may permit the OSSP to invoice the product manufacturing entity for the devaluation of unused inventory items purchased from appropriate suppliers for the purposes of satisfying the OSSP's service and support operations for the product manufacturing entity. However, the OSSP may be prohibited from invoicing the product manufacturing entity for the devaluation of unused inventory items added to the inventory otherwise, such as inventory items added in excess of those needed to satisfy the OSSP's service and support obligations for the particular product manufacturing entity, or unused inventor items added by reclaiming replaced equipment returned by customers, the latter of which is described in greater detail below. Examples of inventory requirements that may cause the product manufacturing entity to be invoiced by the OSSP for unused inventory include, but are not limited to, required parts/equipment inventory levels specified by the product manufacturing entity, required parts/equipment models, brands, etc., specified by the product manufacturing entity and that the OSSP has to purchase in minimum bulk quantities (e.g., and that could yield substantial unused inventory), required parts/equipment models, brands, etc., specified by the product manufacturing entity and that are rendered obsolete by a subsequent product design change made by the product manufacturing entity, etc. If, however, the product manufacturing entity does not set inventory requirements for the OSSP (block 554), then the OSSP is responsible for setting its own inventory levels and, thus, assumes the risk of any unused inventory devaluation (block 558).

Turning to block 548 of FIG. 5C, after replacement equipment is shipped to the customer for self-repair (block 546), the OSSP waits for the corresponding replaced (e.g., faulty) equipment to be returned by the customer in exchange for receiving the replacement equipment, unless the replaced equipment is not to be returned because it has such a low value, or it is storing sensitive data, etc. For example, the customer can return the replaced (e.g., faulty) equipment using the same shipping packaging used to previously ship the replacement equipment to the customer. If the OSSP does not receive the replaced equipment from the customer, for example, because the customer fails to return it, or is not to return it due to its low value, sensitive data, etc. (block 548), then the manufacturer invoicing unit 246 can invoice the product manufacturing entity for the value of the unreturned equipment according to the contract terms/agreement information stored in the data storage unit 214 and/or locally in the OSSP outsourcing system 120 (block 560). For example, because the OSSP may be able to increase profitability be reclaiming returning customer equipment that can be reused (e.g., because it is not faulty or after being refurbished) and added back into the OSSP's inventory (e.g., instead of purchasing new equipment to replenish the inventory), the product manufacturing entity may agree to compensate the OSSP for equipment that the customer fails to return properly.

However, if the OSSP receives the replaced equipment from the customer (block 548), the OSSP contacts the appropriate supplier to determine whether the replaced equipment is covered under warranty (block 562). For example, and as described above, the warranty servicing unit 270 included in the supplier outsourcing system 130 can determine whether the replaced equipment is under warranty. If the replaced equipment is under warranty (block 562), then the OSSP returns the equipment to the supplier for a replacement (e.g., which can be added to the OSSP's inventory) or a monetary credit (block 564). A corresponding credit can then be passed along to the product manufacturing entity by appropriate adjustment of the invoice determined at block 550 of FIG. 5A. In some examples, if full credit or new equipment is provided by the supplier under the warranty, then no invoice for the replaced equipment will be generated at block 550.

Returning to FIG. 5C, if the replaced equipment is not under warranty (block 562), then the OSSP determines whether a repair solution exists that can be used to economically refurbish the equipment (block 566). The product manufacturing entity may also be involved in the determination at block 562 if, for example, the product manufacturing entity sets specification that are to be met by the repaired equipment. If a repair solution exists (or no fault is found with the returned equipment), an OSSP technician (or a third party engaged by the product manufacturing entity or by the OSSP, possibly with approval from the product manufacturing entity) repairs the equipment returned by the customer (if needed) based on any out-of-warranty plan, and then adds the repaired equipment to the OSSP's inventory (block 568). In this example, the OSSP is not required to pass along any potential value of the repaired equipment to the product manufacturing entity, thereby providing a potential profit incentive for the OSSP to attempt to repair equipment returned by the customer rather than automatically scrapping it. If, however, a repair solution does not exist (block 566), then the OSSP scraps the returned equipment and, as discussed above in connection with block 560, the OSSP can invoice the product manufacturing entity for the value of the scrapped equipment according to the contract terms/agreement information stored in the data storage unit 214 and/or locally in the OSSP outsourcing system 120 (block 570). The process 500 then ends.

An example process 600 that may be performed to implement at least portions of the supplier outsourcing system 130 of FIGS. 1 and/or 2C is illustrated in FIG. 6. With reference to FIGS. 1 and 2A-D, the example process 600 of FIG. 6 begins at block 604 at which the OSSP interface unit 262 included in the supplier outsourcing system 130 receives (e.g., electronically) an order from the OSSP outsourcing system 120 for repair parts and/or replacement equipment. At block 608, the supplier (e.g., OEM, ODM, etc.) fulfills the order. Then, at block 612 the OSSP invoicing unit 268 included in the supplier outsourcing system 130 generates and sends an invoice for the ordered repair parts and/or replacement equipment according to the contract terms/agreement information stored in the data storage unit 216, the OSSP outsourcing system 120 and/or the supplier outsourcing system 130. For example, and as described above, the cost/price of repair parts and/or replacement equipment ordered by OSSPs can be determined (e.g., via negotiation) based an amount (e.g., volume or quantity) of substantially identical parts/equipment (e.g., the same version or different version of a particular part/equipment) or similar (e.g., compatible) parts/equipment to be purchased by the product manufacturing entity separately for product manufacturing purposes, rather than having the costs/prices being based on just the (usually smaller) amounts (e.g., volumes/quantities) to be purchased individually by the OSSP. The process 600 then ends.

An example process 700 that may be performed to implement at least portions of the 3PL outsourcing system 135 of FIGS. 1 and/or 2D is illustrated in FIG. 7. With reference to FIGS. 1 and 2A-D, the example process 700 of FIG. 7 begins at block 704 at which the order interface unit 282 included in the 3PL outsourcing system 135 receives (e.g., electronically) a shipping request from the OSSP outsourcing system 120 or from a customer. At block 708, the 3PL provider ships the customer unit or the replacement equipment that is the subject of the shipping request to the appropriate destination. Then, at block 712 the OSSP invoicing unit 288 retrieves and processes the contract terms/agreement information stored in the data storage unit 218, the OSSP outsourcing system 120 and/or the 3PL outsourcing system 135 to determine whether the OSSP or the product manufacturing entity is to be invoiced for the shipment at block 708. If the OSSP is to be invoiced (block 712), the OSSP invoicing unit 288 generates and sends an invoice for shipping the unit/equipment to the OSSP according to the retrieved contract terms/agreement information (block 716). For example, and as described above, the shipping rates for a particular OSSP can be determined (e.g., via negotiation) based on an overall volume/quantity of shipments to/from all OSSPs providing outsourcing service and support for the product manufacturing entity, rather than having the shipping rates being based on just the (usually smaller) shipment volumes/quantities associated with each OSSP individually. However, if the product manufacturing entity is to be invoiced (block 712), then the OSSP invoicing unit 288 invoices the product manufacturing entity directly (e.g., using an account number assigned to the product manufacturing entity) at a rate specified for shipment of items associated with the product manufacturing entity. The process 700 then ends.

Figure 8:
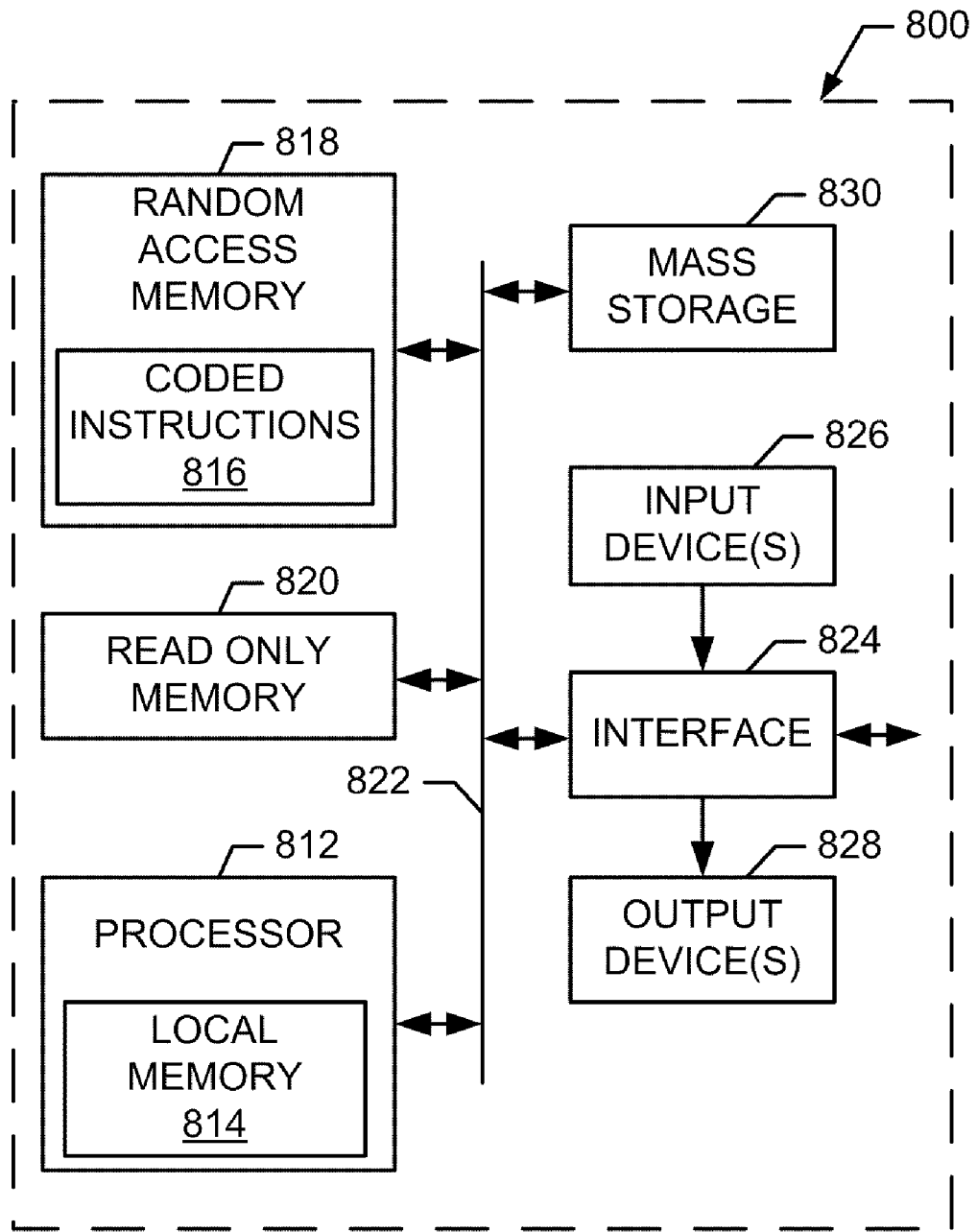
FIG. 8 is a block diagram of an example processing system that may execute example machine readable instructions used to implement at least portions of the processes of FIGS. 3-7 to implement the manufacturer enterprise system, the OSSP outsourcing system, the supplier outsourcing system and/or the 3PL outsourcing system of FIGS. 2A-D, and/or the service and support outsourcing system of FIG. 1.

FIG. 8 is a block diagram of an example processing system 800 capable of implementing the systems and methods disclosed herein. The processing system 800 can be, for example, a server, a personal computer, a personal digital assistant (PDA), an Internet appliance, or any other type of computing device. The processing system 800 can be used to implement, for example, the OSSP outsourcing system 120, the supplier outsourcing system 130, the 3PL outsourcing system 135 and/or, more generally, the service and support outsourcing system 100.

The system 800 of the instant example includes a processor 812 such as a general purpose programmable processor. The processor 812 includes a local memory 814, and executes coded instructions 816 present in the local memory 814 and/or in another memory device. The processor 812 may execute, among other things, machine readable instructions to implement at least portions of the processes represented in FIGS. 3-7. The processor 812 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 812 is in communication with a main memory including a volatile memory 818 and a non-volatile memory 820 via a bus 822. The volatile memory 818 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 820 may be implemented by flash memory and/or any other desired type of memory device. Access to the main memory 818, 820 is typically controlled by a memory controller (not shown).

The processing system 800 also includes an interface circuit 824. The interface circuit 824 may be implemented by any type of interface standard, such as an Ethernet interface, a universal serial bus (USB), and/or a third generation input/output (3GIO) interface.

One or more input devices 826 are connected to the interface circuit 824. The input device(s) 826 permit a user to enter data and commands into the processor 812. The input device(s) can be implemented by, for example, a keyboard, a mouse, a touchscreen, a track-pad, a trackball, an isopoint and/or a voice recognition system.

One or more output devices 828 are also connected to the interface circuit 824. The output devices 828 can be implemented, for example, by display devices (e.g., a liquid crystal display, a cathode ray tube display (CRT)), by a printer and/or by speakers. The interface circuit 824, thus, typically includes a graphics driver card.

The interface circuit 824 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 800 also includes one or more mass storage devices 830 for storing software and data. Examples of such mass storage devices 830 include floppy disk drives, hard drive disks, solid state drives, compact disk drives and digital versatile disk (DVD) drives. The mass storage device 830 may implement any, some or all of the data storage units 206, 214, 216, 218, 236, 264 and 284. Additionally or alternatively, the volatile memory 818 may implement any, some or all of the data storage units 206, 214, 216, 218, 236, 264 and 284.

As an alternative to implementing the methods and/or systems described herein in a system such as the processing system of FIG. 8, the methods and or systems described herein may be embedded in a structure such as a processor and/or an ASIC (application specific integrated circuit).

Finally, although certain example methods, systems and articles of manufacture have been described herein, the scope of coverage of this patent is not limited thereto. On the contrary, this patent covers all methods, systems and articles of manufacture fairly falling within the scope of the appended claims either literally or under the doctrine of equivalents.

What is claimed is:

1. A method to outsource service and support operations, the method comprising:
   using a processor to maintain an inventory at an outsourced service and support partner (OSSP) without intervention by a separate manufacturing entity by ordering inventory items from a supplier separate from the manufacturing entity and the OSSP at a cost determined based on an amount of similar or substantially identical inventory items obtained separately by the manufacturing entity for manufacturing units, the OSSP being a first of a plurality of OSSPs;
   using the inventory to at least one of service a unit returned to the OSSP by a customer or ship an inventory item from the OSSP to the customer in response to receiving an order notification from the manufacturing entity at the OSSP; and
   using a processor to coordinate shipping of at least one of the units between the first OSSP and the customer or the inventory item from the first OSSP to the customer using a third party logistics provider at a shipping rate based on a total volume of expected shipments associated with the manufacturing entity across all of the plurality of OSSPs.

2. A method as defined in claim 1 further comprising invoicing the manufacturing entity for devaluation of unused inventory if the manufacturing entity specifies inventory requirements.

3. A method as defined in claim 2 wherein invoicing the manufacturing entity for the devaluation of the unused inventory comprises invoicing the manufacturing entity for devaluation of unused inventory items obtained from the supplier but not invoicing the manufacturing entity for devaluation of unused inventory items obtained by adding customer returned items to the inventory.

4. A method as defined in claim 1 further comprising invoicing the manufacturing entity for the inventory item shipped to the customer, a value of the inventory item being adjusted based on a duration of time expected to elapse from a first time when the inventory item was shipped to the customer and a second time when the manufacturing entity is invoiced.

5. A method as defined in claim 1 wherein maintaining the inventory further comprises: determining whether an item returned by the customer in exchange for the inventory item sent from the first OSSP to the customer can be reused; and if the customer returned item can be reused, adding the customer returned item to the inventory.

6. A method as defined in claim 1 further comprising sending a completion notification from the first OSSP to the manufacturing entity when at least one of the units is shipped from the first OSSP to the customer after servicing or the inventory item is shipped from the first OSSP to the customer to enable a quality control evaluation using an elapsed time from the order notification being sent to the completion notification being received.

7. A tangible article of manufacture storing machine readable instructions which, when executed, cause a machine to at least:
   maintain an inventory at an outsourced service and support partner (OSSP) separate from a manufacturing entity by obtaining inventory items from a supplier separate from the manufacturing entity and the OSSP at a price determined based on an amount of similar or substantially identical inventory items obtained separately by the manufacturing entity for manufacturing units, the inventory to be used by the OSSP to at least one of service a unit returned to the OSSP by a customer or ship a particular inventory item from the OSSP to the customer in response to an order received from the manufacturing entity at the OSSP, the OSSP being a first of a plurality of OSSPs associated with the manufacturing entity;
   invoice the manufacturing entity for devaluation of an unused inventory item when the manufacturing entity specifies inventory requirements for the unused inventory item; and
   coordinate shipping of at least one of the units between the first OSSP and the customer or the particular inventory item from the first OSSP to the customer using a third party logistics provider at a shipping rate based on a total volume of expected shipments associated with the manufacturing entity across all of the plurality of OSSPs.

8. A tangible article of manufacture as defined in claim 7 wherein the machine readable instructions, when executed, cause the machine to invoice the manufacturing entity for devaluation of the unused inventory items when the unused inventory item is obtained from the supplier but to not invoice the manufacturing entity for devaluation of the unused inventory item when the unused inventory item is obtained from a customer of the manufacturing entity.

9. A tangible article of manufacture as defined in claim 7 wherein the machine readable instructions, when executed, further cause the machine to invoice the manufacturing entity for the particular inventory item shipped to the customer, a value of the particular inventory item being adjusted based on a duration of time expected to elapse from a first time when the inventory item was shipped to the customer and a second time when the manufacturing entity is invoiced.

10. An outsourced service and support partner (OSSP) outsourcing system comprising:
  a processor to implement an inventory manager, the inventory manager to maintain an inventory at an OSSP separate from a manufacturing entity and without intervention by the manufacturing entity, the inventory to be used by the OSSP to at least one of service a unit returned to the OSSP by a customer or ship a particular inventory item from the OSSP to the customer in response to an order received from the manufacturing entity at the OSSP, the OSSP being a first of a plurality of OSSPs;
  a supplier interface unit to order inventory items to be added to the inventory by the inventory manager from a supplier separate from the manufacturing entity and the OSSP at a cost determined based on an amount of similar or substantially identical inventory items obtained separately by the manufacturing entity for manufacturing units;
  a manufacturer invoicing unit to invoice the manufacturing entity for each inventory item shipped to the customer, a value of each inventory item adjusted based on a duration of time expected to elapse from a first time when the inventory item was used to service the unit or shipped to the customer and a second time when the manufacturing entity is invoiced; and
  a third party logistics interface unit to coordinate shipping of at least one of the units between the first OSSP and the customer or the particular inventory item from the first OSSP to the customer using a third party logistics provider at a shipping rate based on a total volume of expected shipments associated with the manufacturing entity across all of the plurality of OSSPs.

11. A system as defined in claim 10 wherein the manufacturer invoicing unit further is to invoice the manufacturing entity for devaluation of unused inventory if the manufacturing entity specifies inventory requirements, but to not invoice the manufacturing entity for the devaluation of the unused inventory if the manufacturing entity does not specify the inventory requirements.

12. A system as defined in claim 11 wherein, when the manufacturing entity is to be invoiced for the devaluation of the unused inventory, the manufacturer invoicing unit is to invoice the manufacturing entity for devaluation of unused inventory items obtained from the supplier but to not invoice the manufacturing entity for devaluation of unused inventory items obtained by adding customer returned items to the inventory.

13. A system as defined in claim 10 wherein the inventory manager is to add a customer returned item to the inventory if the customer returned item is determined to be reusable, the customer returned item having been returned in exchange for the particular inventory item sent from the first OSSP to the customer.

* * * * *